(12) United States Patent
Moyne et al.

(10) Patent No.: US 7,974,723 B2
(45) Date of Patent: Jul. 5, 2011

(54) YIELD PREDICTION FEEDBACK FOR CONTROLLING AN EQUIPMENT ENGINEERING SYSTEM

(75) Inventors: James Moyne, Canton, MI (US);
Nicholas Ward, San Jose, CA (US);
Richard Stafford, Bountiful, UT (US)

(73) Assignee: Applied Materials, Inc., Santa Clara, CA (US)

( * ) Notice: Subject to any disclaimer, the term of this patent is extended or adjusted under 35 U.S.C. 154(b) by 385 days.

(21) Appl. No.: 12/210,989

(22) Filed: Sep. 15, 2008

(65) Prior Publication Data

US 2009/0228129 A1 Sep. 10, 2009

Related U.S. Application Data

(60) Provisional application No. 61/068,652, filed on Mar. 6, 2008, provisional application No. 61/055,954, filed on May 23, 2008.

(51) Int. Cl.
*G06F 19/00* (2006.01)
(52) U.S. Cl. ........................................ 700/101; 700/121
(58) Field of Classification Search .................. 700/101, 700/121
See application file for complete search history.

(56) References Cited

U.S. PATENT DOCUMENTS

| | | | |
|---|---|---|---|
| 5,740,065 A | 4/1998 | Jang et al. | |
| 6,449,749 B1 | 9/2002 | Stine | |
| 6,470,229 B1 | 10/2002 | Wang et al. | |
| 6,834,375 B1 | 12/2004 | Stine et al. | |
| 6,947,803 B1 | 9/2005 | Bode et al. | |
| 7,308,669 B2 | 12/2007 | Buehler et al. | |
| 7,502,658 B1 * | 3/2009 | Barbee et al. | 700/109 |
| 7,657,339 B1 * | 2/2010 | Retersdorf | 700/121 |
| 2009/0317924 A1 * | 12/2009 | Ouyang et al. | 438/5 |

OTHER PUBLICATIONS

Appello, D., et al., "Enabling Effective Yield Learning through Actual DFM-Closure at the SoC Level," 2007 IEEE/SEMI Advanced Semiconductor Manufacturing Conference, Jun. 2007, pp. 148-152.
Baweja, Gurshaman Singh, et al., "Real-time Lot Dispatching for Semiconductor Fab," Future Fab International, Issue 11, Jun. 2001.
Khan, Aftab, et al., Fab-wide Control utilizing Virtual Metrology,: IEEE Transactions on Semiconductor Manufacturing—Special Issue on Advanced Process Control, Nov. 2007, vol. 20, No. 4, pp. 364-375.
Lin, Tung-Ho, et al., "A Novel Key-variable Sifting Algorithm for Virtual Metrology," 2008 IEEE International Conference on Robotics and Automation (ICRA), May 2008, pp. 3636-3641.
Moyne, J., "A Blueprint for Enterprise-Wide Deployment of Advanced Process Control," Solid State Technology, Vo. 52, No. 7 Jul. 2009.

(Continued)

*Primary Examiner* — Ryan A Jarrett
(74) *Attorney, Agent, or Firm* — Blakely, Sokoloff, Taylor & Zafman LLP

(57) ABSTRACT

A yield prediction is received by a scheduling and dispatch controller, wherein the yield prediction is associated with a manufacturing tool and a product. A weighting of the manufacturing tool is adjusted in a routing algorithm based on the yield prediction. A cost-benefit analysis is computed that identifies a cost and a benefit of manufacturing future products on the manufacturing tool. A determination is made regarding whether to process a future product on the manufacturing tool based on the cost-benefit analysis.

12 Claims, 23 Drawing Sheets

OTHER PUBLICATIONS

Nurani, Raman K., et al., "In-line yield prediction methodologies using patterned wafer inspection information," IEEE Transactions on Semiconductor Manufacturing, vol. 11, No. 1, Feb. 1998, pp. 40-47.

PCT International Search Report and Written Opinion for International Application No. PCT/US2009/033347, mailed Sep. 18, 2009, 12 pages.

Besnard, Jerome, et al., "How to Build Meaningful Indicators From Raw Temporal Traces," AEC/APC Symposium XIX, Sep. 15-20, 2007, Indian Wells CA, 33 pages. PDF Solutions.

Khan, Aftab A., et al., "An Approach for Factory-Wide Control Utilizing Virtual Metrology," pp. 364-375, IEEE Transactions on Semiconductor Manufacturing, vol. 20, No. 4, Nov. 2007 0894-6507 Copyright 2007 IEEE.

Khan, Aftab, et al., "On the Quality of Virtual metrology Data for Use in the Feedback Process Control," AEC/APC Symposium XIX, Sep. 15-20, 2007, Indian Wells, CA, 25 pages.

Moyne, J., et al, "Run-to-Run Control in Semiconductor Manufacturing" 2001, 90 pages, CRC Press.

Moyne, James, "The Evolution of APC: The Move to Total Factory Control" (Invited-feature article), Solid State Technology, vol. 47, No. 9, Sep. 2004. http://www.solid-state.com/display_article/211211/5/none/none/Feat/Making-the-move-to-fab-wide-APC.

Moyne, James R., et al., SEMI E133: The Process Control System Standard: Deriving a Software Interoperability Standard for Advanced Process Control in Semiconductor Manufacturing, IEEE Transactions on Semiconductor Manufacturing, Nov. 2007, pp. 408-420, vol. 20, No. 4.

Tobin, Kenneth W., et al., "Integrated Yield Management," Oak Ridge National Laboratory, Oak Ridge TN and SEMATECH, Austin TX. 13 pages.

Turaga, D.S., et al., "Online FDC Control Limit Tuning with Yield Prediction using Incremental Decision Tree Learning," IBM Research, IBM Corporation, 2006, 23 pages.

Ward, Nick, "Future Directions in APC from an Equipment and APC Supplier Perspective," (Keynote), AEC/APC Symposium XIX, Indian Wells, CA Sep. 2007.

Wijayah, H., et al., "Reconfigurable Factory-Wide Resource-Based System Integration for Control" The 2006 IEEE International Electro/Information Technology Conference, East Lansing, Michigan USA May 2006.

Yu, Michael, et al., "Yield Aware™ Process Control Solutions," PDF Solutions, AEC/APC Symposium XIX, Sep. 15-20, 2007, Indian Wells, CA, 37 pages.

Moyne, James, et al., "Yield Management Enhanced Advanced Process Control System (YMeAPC)—Part I: Description and Case Study of Feedback for Optimized Multiprocess Control" IEEE Transactions on Semiconductor Manufacturing, vol. 23, No. 2, May 2010, pp. 15.

* cited by examiner

YIELD PREDICTION FEEDBACK FOR CONTROLLING AN EQUIPMENT ENGINEERING SYSTEM

RELATED APPLICATIONS

This patent application claims the benefit under 35 U.S.C. §119(e) of U.S. provisional application No. 61/068,652, filed Mar. 6, 2008, and of U.S. provisional application No. 61/055,954, filed May 23, 2008, which are herein incorporated by reference.

TECHNICAL FIELD

Embodiments of the present invention relate yield prediction, and more specifically to performing automated actions in response to a yield prediction.

BACKGROUND

Equipment Engineering Systems (EES) manage the processing of product by manufacturing machines. Yield Management Systems (YMS) utilize parametric and e-test data to analyze yield excursions. Some conventional YMSs leverage data from a fault detection and classification (FDC) system of conventional equipment engineering systems (EES) to provide yield engineers additional data when analyzing yield. In a limited number of conventional YMSs, the data from the FDC system is used to predict yield. This yield prediction may enable yield engineers to detect potential yield problems before a product has been completed. However, in conventional manufacturing environments there is no mechanism for providing the predicted yield information to subsystems of the EES. Nor are subsystems of the conventional EES equipped to perform automated actions in response to yield predictions.

BRIEF DESCRIPTION OF THE DRAWINGS

The present invention is illustrated by way of example, and not by way of limitation, in the figures of the accompanying drawings and in which.

DETAILED DESCRIPTION

Figure 1:
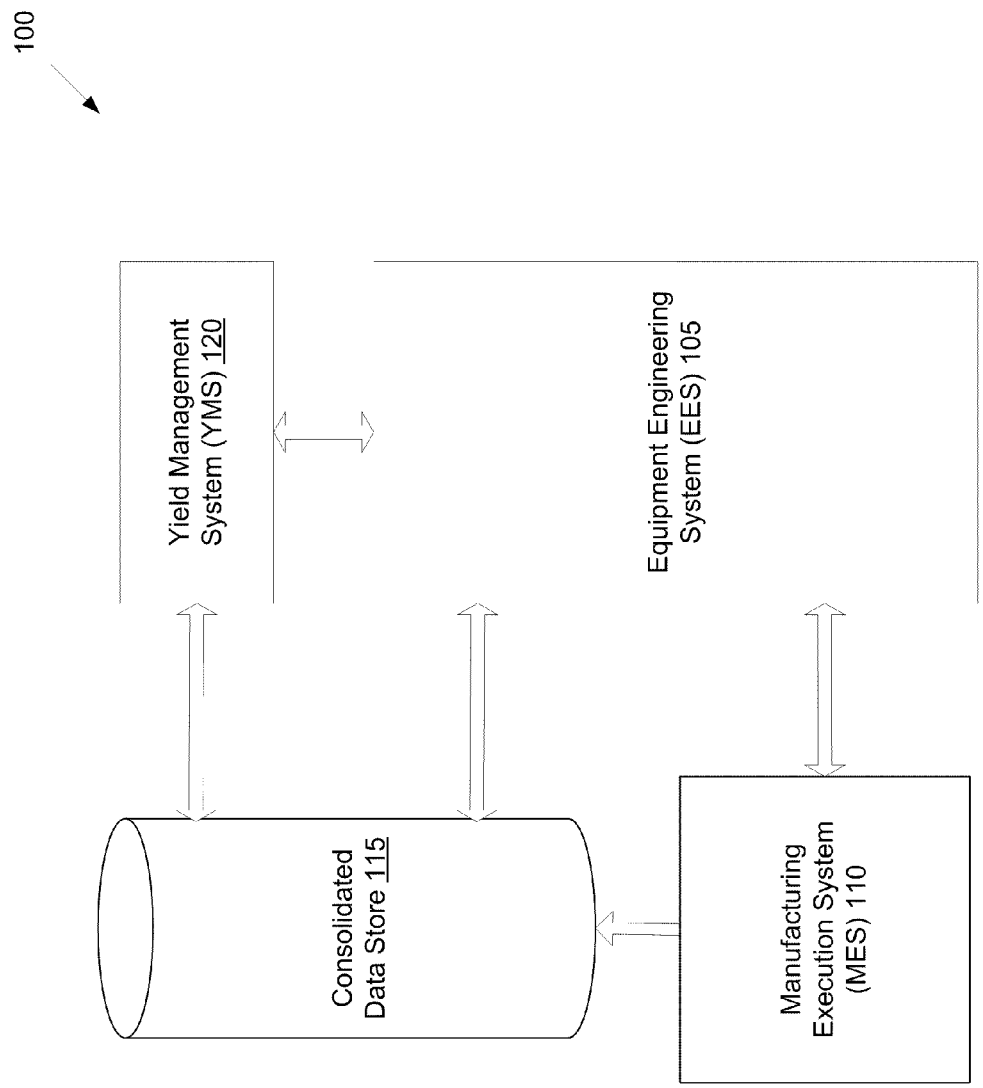
FIG. 1 illustrates an exemplary architecture of a manufacturing environment, in which embodiments of the present invention may operate.

Described herein is a method and apparatus for performing automated actions in response to yield predictions. An end-of-line yield prediction is generated based on data associated with a manufacturing process, a manufacturing tool and/or a manufactured product. The end-of-line yield prediction is sent to a one or more components of an equipment engineering system. In one embodiment, the yield prediction is received by a scheduling and dispatch controller. A weighting of the manufacturing tool is adjusted in a routing algorithm based on the yield prediction. A cost-benefit analysis is computed that identifies a cost and a benefit of manufacturing future products on the manufacturing tool. A determination is made regarding whether to process a future product on the manufacturing tool based on the cost-benefit analysis.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. Unless specifically stated otherwise, as apparent from the following discussion, it is appreciated that throughout the description, discussions utilizing terms such as "collecting", "predicting", "performing", "adjusting", "comparing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary architecture of a manufacturing environment 100, in which embodiments of the present invention may operate. The manufacturing environment 100 may be a semiconductor manufacturing environment, an automotive manufacturing environment, etc. In one embodiment, the manufacturing environment 100 includes an equipment engineering system (EES) 105, a manufacturing execution system (MES) 110, a yield management system (YMS) 120 and a consolidated data store 115. The EES 105, MES 110, YMS 120 and consolidated data store 115 may be connected via a network (not shown), such as a public network (e.g., Internet), a private network (e.g., Ethernet or a local area Network (LAN)), or a combination thereof.

The manufacturing execution system (MES) 110 is a system that can be used to measure and control production activities in a manufacturing environment. The MES 110 may control some production activities (e.g., critical production activities) or all production activities of a set of manufacturing equipment (e.g., all photolithography equipment in a semiconductor fabrication facility), of a manufacturing facility (e.g., an automobile production plant), of an entire company, etc. The MES 110 may include manual and computerized off-line and/or on-line transaction processing systems. Such systems may include manufacturing machines, metrology devices, client computing devices, server computing devices, databases, etc. that may perform functions related to processing.

In one embodiment, the MES 110 is connected with a consolidated data store 115. The consolidated data store 115 may include databases, file systems, or other arrangements of data on nonvolatile memory (e.g., hard disk drives, tape drives, optical drives, etc.), volatile memory (e.g., random access memory (RAM)), or combination thereof. In one embodiment, the consolidated data store 115 includes data from multiple data stores (e.g., a YMS data store, a maintenance data store, a metrology data store, process data stores, etc.) that are interconnected. The consolidated data store 115 may store, for example, historical process information of manufacturing recipes (e.g., temperatures, pressures, chemicals used, process times, etc.), equipment maintenance histories, inventories, etc. The consolidated data store 115 may also store data generated by the MES 110, YMS 120 and/or EES 105. For example, the EES 105 may store fault detection and characterization data in the consolidated data store 115, the YMS 120 may store yield analysis data in the consolidated data store 115, and the MES 110 may store historical process information in the consolidated data store 115. This permits each of the YMS 120, EES 105 and MES 110 to leverage data generated by the other systems.

The EES 105 is a system that manages some or all operations of a factory. The EES 105 may include manual and computerized off-line and/or on-line transaction processing systems that may include client computing devices, server computing devices, databases, etc. that may perform the functions of equipment tracking, dispatching (e.g., determining what material goes to what processes), product genealogy, labor tracking (e.g., personnel scheduling), inventory management, costing, electronic signature capture, defect and resolution monitoring, key performance indicator monitoring and alarming, maintenance scheduling, and so on.

The EES 105 draws inferences from, reports out, and/or acts upon the combined information that is collected and stored in the consolidated data store 115 and/or the metrology data and process data that is reported by the MES 110. For example, EES 105 can act as an early warning system (e.g., predict scrap, initiate product rework, etc.), provide bottleneck analysis, provide asset management (e.g., reduce unscheduled equipment downtime), improve lean practices, etc. The EES 105 can be used to gain an understanding of the manufacturing environment 100, and can enable a user to determine an efficiency of the manufacturing environment 100 and/or how to improve all or components of the manufacturing environment 100. In one embodiment, the EES 105 includes components that enable the EES 105 to detect faults, classify faults, and predict yield. Such capabilities are explained in greater detail below with reference to FIG. 2.

The yield management system (YMS) 120 analyzes end-of-line data such as e-test data to determine product yield. The end-of-line data may include wafer acceptance testing (WAT), wafer sort results and/or final test operations. The yield manager 120 can provide product yield trends, lot level analysis of product yield, yield correlation to manufacturing processes, statistical analysis of yield, etc. In one embodiment, the YMS 120 uses integrated circuit design, visible defect, parametric and e-test data to identify causes of low yield. The YMS 120 can improve yield by monitoring yield, associating yield loss to defects and parametric data, and associating defects and parametric data to processes and tools. If product yield is too low, yield management system 120 may report the low yield to EES 105. Such a report may include an indication of key contributors to the low yield. EES 105 may then take actions to increase yield. The YMS 120 stores yield data in the consolidated data store 115, and may access data stored by the MES 110 and EES 105 to better troubleshoot any yield problems.

Figure 2:
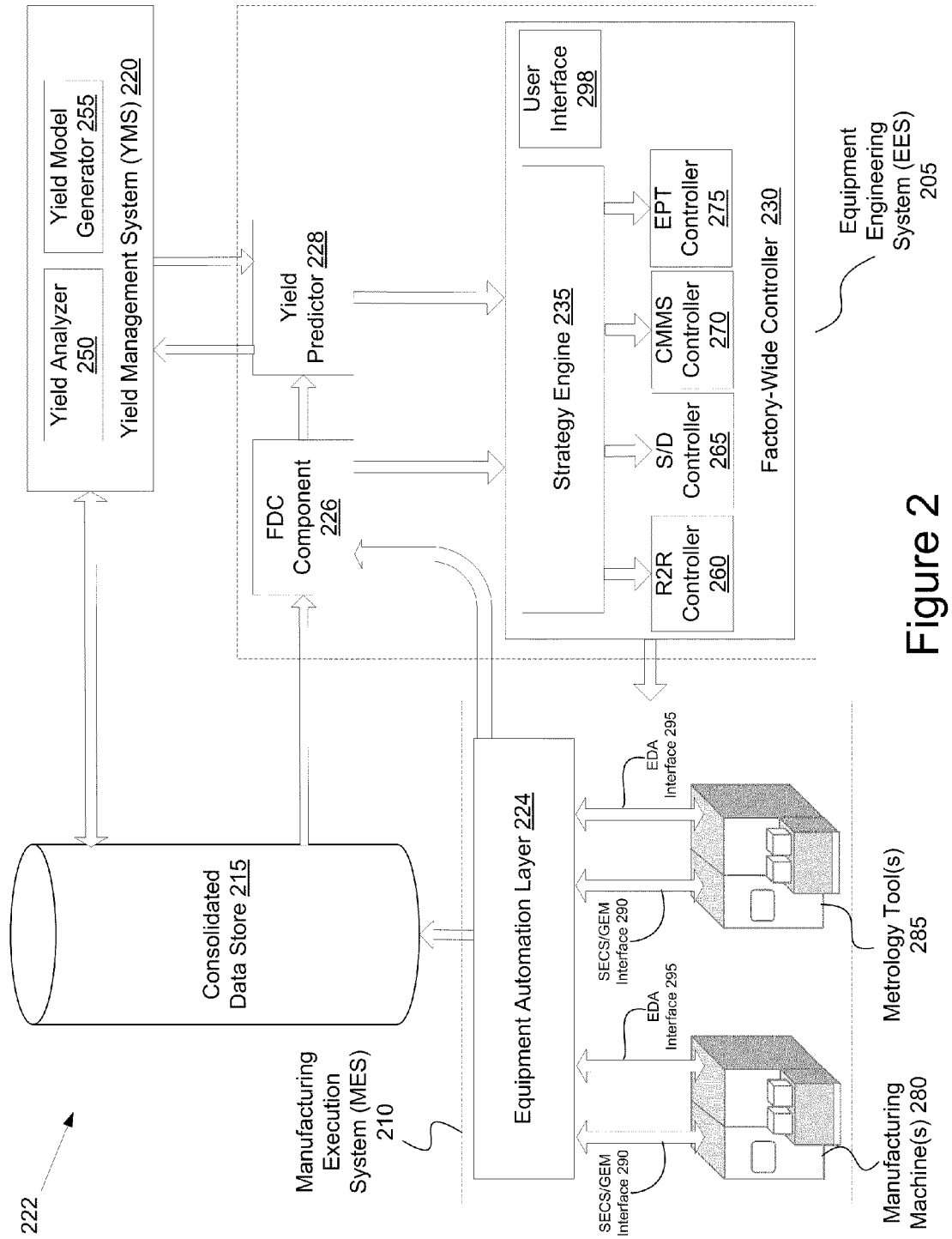
FIG. 2 illustrates an exemplary architecture of another manufacturing environment, in which embodiments of the present invention may operate.

FIG. 2 illustrates an exemplary architecture of a manufacturing environment 222, in which embodiments of the present invention may operate. In one embodiment, the manufacturing environment 222 includes a MES 210, a YMS 220, an EES 205 and a consolidated data store 215. In a further embodiment, the manufacturing environment 222 corresponds to manufacturing environment 200 of FIG. 1.

In the MES 210 of FIG. 2, manufacturing machines 280 and metrology tools 285 are illustrated. Examples of manufacturing machines in a semiconductor manufacturing environment include implanters, thermal reactors, etchers, lithography machines, and other machines for processing semiconductor product. Examples of metrology tools include ellipsometers, interferometers, scanning electron microscopes (SEMs), etc. Though the MES 210 is shown to include only manufacturing machines 280 and metrology tools 285, it may also include client computing devices, server computing devices, databases, etc., which are not shown for clarity. The metrology tools 285, manufacturing machines 280 and additional devices of the MES 210 are linked to an equipment automation layer 224 via one or more interfaces. Examples of interfaces include a semiconductor equipment communications standards (SECS) interface, a generic model for communications and control of manufacturing equipment (GEM) interface, a SECS/GEM interface 290, an EDA ("Interface A") interface 295, a high speed SECS message services (HSMS) interface, etc.

The equipment automation layer 224 interconnects the manufacturing machines 280, metrology tools 285 and other devices, and links them to the consolidated data store 215, the EES 205 and/or the YMS 220. In one embodiment, the equipment automation layer 224 enables process data (e.g., data collected by a manufacturing machine 280 during a process run) and metrology data (e.g., data collected by a metrology tool 285 after a process run) to be stored in the consolidated data store 215 and to be reported to a fault detection and classification (FDC) component 226 of the EES 205. Such data may be reported to the FDC component 226 in real time as the data is collected.

In one embodiment, EES 205 includes a fault detection and classification component (FDC) 226, a yield predictor 228 and a factory wide controller 230. The EES 205 may also include a user interface 298 that can combine disparate information from multiple different sources (e.g., the YMS 220, the MES 210, the EES 230, etc.), and present this information in a unified manner.

FDC component 226 can receive data in real time from the equipment automation layer 224 as the data is collected and/or from the consolidated data store 215. The data may include process data that has been gathered by the manufacturing machines during a process run and/or metrology data that was gathered after a process run. Each manufacturing process that is performed on a manufacturing machine 280 is characterized by various physical conditions and properties measured by sensors of the manufacturing machine 280, and by various operating parameters, collectively referred to as process data. Each distinct physical condition or property measured by sensors, and each operating parameter, may be a distinct process variable of the process data. Examples of process variables representing sensor data include chamber pressure, susceptor temperature, RF forward power, and RF reflected power. Examples of process variables representing operating parameters include flow rate settings (e.g., of chemical reagents), and throttle valve settings (e.g., for a chamber exhaust vacuum pump). After a product is processed in a manufacturing machine 280, the product may be analyzed by a metrology device 285 to measure one or more properties of the product. Measurements produced by such analysis are referred to herein as metrology data. Examples of metrology data include thickness measurements (e.g., a measured by an ellipsometer), particle count measurements (e.g., as measured by a scanning electron microscope (SEM)), wafer curvature measurements (e.g., as measured by an interferometer), etc.

The FDC component 226 may use statistical process monitoring (a means of performing statistical analysis on process data and metrology data), genetic algorithms, neural networks, etc. to detect and/or diagnose faults. A fault can be a malfunction or maladjustment of manufacturing machines 280 (e.g., deviation of a machine's operating parameters from intended values), or an indication of a need for preventive maintenance to prevent an imminent malfunction or maladjustment. A fault is detected when one or more of the statistics of recent process data and/or metrology data deviate from a statistical model by an amount great enough to cause a model metric to exceed a respective confidence threshold. A model metric is a scalar number whose value represents a magnitude of deviation between the statistical characteristics of process/metrology data and the statistical characteristics predicted by the model.

Once a fault has been detected, the FDC component 226 compares the fault to a collection of fault signatures. Each fault signature represents process conditions representative of a specific fault or faults. When there is a high degree of similarity between one of the fault signatures and the current fault, a match is reported, and the fault is classified. Alternatively, the FDC component 226 may use statistical summary techniques that are then matched to the values for previous occurrences of faults to find a fault that is the closest.

In one embodiment, the FDC component 226 includes a virtual metrology module (not shown) that uses virtual metrology to predict metrology data based on other metrology data and/or process data. The virtual metrology module utilizes both fault detection/classification data (including information pertaining to a detected fault such as contributions to the fault, an identification/classification of the fault, etc.) and upstream metrology data as input, and produces predictions of metrology data values as output. The virtual metrology prediction models may be updated when actual metrology data is available.

The FDC component 226 sends fault detection and classification data to the yield predictor 228. The FDC component 226 may also send virtual metrology data, process data and/or real metrology data to the yield predictor 228. In one embodiment, the FDC component 226 applies data reduction techniques to reduce the amount of data that is sent to yield predictor 228. Alternatively, such data reduction may be performed by the yield predictor 228. Data reduction may be performed by consolidating data (e.g., metrology data, virtual metrology data, process data, etc.) into indicators of importance. For example, temperature measurement process data may be consolidated into an average temperature over an entire process run, or multiple different sensor measurements may be consolidated to provide a single multivariate indicator of the health of the tool. In one embodiment, FDC component 226 determines what consolidated data is relevant to predicting yield based on feedback received from the yield predictor 228. Therefore, the FDC component 226 may limit the information sent to yield predictor 228 to include only the consolidated data relevant to yield prediction.

The yield predictor 228 analyzes the received data to make a yield prediction for a product. Yield predictor 228 relates process data and metrology data to one or more yield prediction models to make yield predictions. The metrology data may include downstream metrology data (collected before a process run), upstream metrology data (collected after a process run) and/or virtual metrology data. The process data may be collected and processed by the FDC component 226 in real time as a process is performed or from the consolidated database after the process has been completed.

The yield prediction models may predict yield using principal component analysis (PCA), multiple linear regression (MLR), neural networks (NR), Bayesian analysis, partial least squares (PLS), etc. Baseline yield prediction models may be received from the YMS 220. As product yield data becomes available, the YMS 220 may modify the yield prediction models, and send updated yield prediction models to the yield predictor 228. Thus, the yield prediction models used by the yield predictor 228 can be dynamic yield prediction models.

Figure 3:
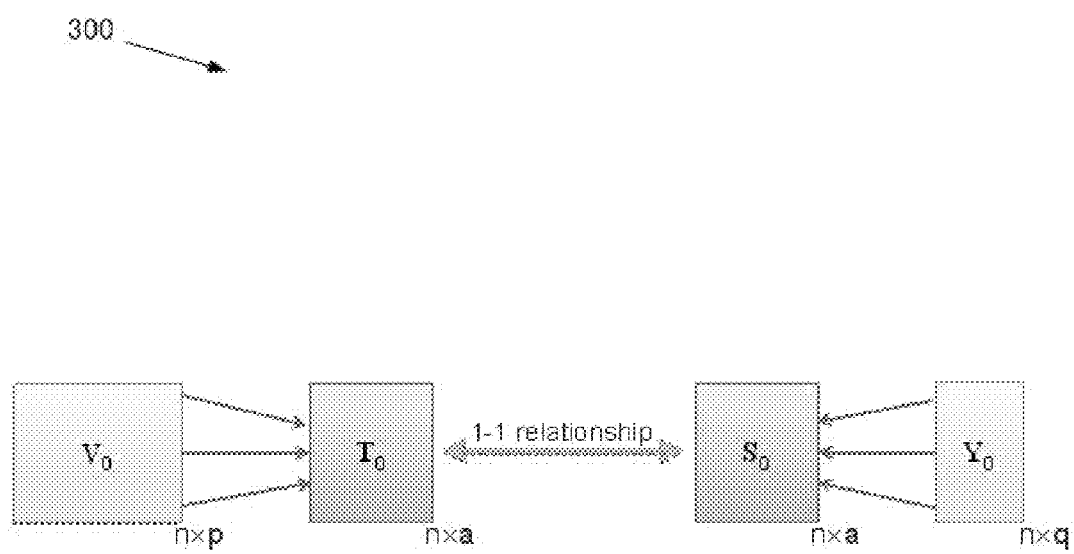
FIG. 3 illustrates an example of how partial least squares (PLS) can be used by a yield predictor, in accordance with one embodiment of the present invention.

In one embodiment, the yield predictor makes yield predictions using PLS. An example of how PLS works is shown in FIG. 3. Referring to FIG. 3, in a system with 'p' inputs (process data, metrology data and/or virtual metrology data of interest in prediction) and 'q' outputs (yield indicators of interest), a relatively small set of 'a' components are utilized to relate variation in the inputs to variation in the outputs. These components can be thought of roughly as the dimensions of variability in the input space that have the most significant impact on dimensions of variability in the output space.

Referring to FIG. 2, in one embodiment, the yield prediction models include multiple yield excursion events and/or yield excursion conditions. A yield excursion event is triggered when process data and/or metrology data indicate a particular yield excursion. For example, if a certain set of conditions are shown by the process data and/or metrology data, a yield excursion event due to Ti/N liftoff may be triggered. Each yield excursion event may be associated with one or more yield excursion conditions. Yield excursion conditions may be triggered if an associated yield excursion event is triggered and if one or more additional conditions are met. Alternatively, some yield excursion conditions may be triggered automatically if a yield excursion event is triggered.

The yield predictor 228 predicts yield with varying degrees of accuracy. The confidence (predicted accuracy) of the yield prediction can depend on numerous variables, such as how close a product is to completion when the yield prediction is made, the quality of the data used to make the prediction, whether the prediction is being made for a relatively new product or for a product that has been successfully manufactured numerous times in the past, and so on. In one embodiment, the yield predictor 228 determines a prediction quality for each yield prediction. The yield prediction quality can later be used in conjunction with the yield prediction to determine what, if any, automated actions to perform by EES subsystems.

In one embodiment, wafer test patterns are used to highlight certain production features for selected products. The wafer test patterns provide additional data that may be used to more accurately predict yield. The wafer test patterns may be manufactured along with product in the same process run. If testing of the wafer test patterns indicates abnormalities, it can be assumed that the abnormalities will also affect the product. Data from the wafer test patterns can be incorporated into the yield model. For example, abnormalities in the wafer test patterns can be associated with specific yield excursions in a yield prediction model. This can enable the yield predictor 228 to make yield predictions with increased confidence.

In one embodiment, the FDC component 226 and the yield predictor 228 are combined into a single component. In such an embodiment, the same models may be used for fault detection and classification, virtual metrology and yield prediction. Alternatively, separate models may be used for one of more of fault detection and classification, virtual metrology and/or yield prediction. In one embodiment, the FDC component 226 includes one or more statistical models that have metrics that are tied to yield excursions. Thus, the FDC component 226 can provide equipment and process health information to the factory-wide controller 230, while at the same time providing input to the yield predictor 228.

The factory-wide controller 230 receives fault detection and fault classification data (which may include virtual metrology data) from the FDC component 226 and yield prediction data from the yield predictor 228. The factory-wide controller 230 is responsible for initiating actions that modify components of the manufacturing environment 200 based on the received fault detection/classification data and yield prediction data. Through such actions, the factory-wide controller 230 can improve both product productivity and quality in an automated fashion. In one embodiment, these actions are in the form of intelligent business rules that can be launched either through real-time system events, predicted events, or scheduled activities. For example, factory-wide controller 230 may automatically schedule maintenance for a manufacturing machine 280, automatically shut down the manufacturing machine 280, automatically adjust a process recipe, etc. when certain values are detected in the received data. In another example, the yield prediction can be utilized as feedback information to augment a run to run (R2R) control capability from lot-to-lot control to wafer-to-wafer control, to augment a maintenance management system and/or to automatically reschedule manufacturing machines that will process product. The actions may also optimize maintenance schedules, scheduling and dispatch decisions, process control, etc.

Although optimum algorithms in the yield prediction domain can become quite complex, the yield prediction data can be leveraged into relatively simplistic algorithms initially and still provide significant benefit. For example, yield thresholds tied to a specific process could be used to generate go/no-go decisions to improve quality and productivity and minimize scrap. In another example, yield trends could be utilized to guide conservative tuning directions to run to run (R2R) process control algorithms, which would result in processing adjustments across the manufacturing environment 222 that are directed towards factory-wide productivity (rather than individual process capability) goals.

The factory-wide controller 230 may include a flexible and scalable capability for integrating multiple different EES subsystems, and a mechanism for governing the collaborative utilization of these subsystems to achieve factory-wide directives. In one embodiment, the factory-wide controller 230 enables interaction between the yield prediction output and EES subsystems such as maintenance management, scheduling and dispatch control and process control via a strategy engine 235. The strategy engine 235 is connected to multiple different controllers, each of which controls a different subsystem of the EES 205. For example, a run to run (R2R) controller 260 controls a R2R system, a schedule and dispatch (S/D) controller 265 controls a scheduling and dispatch system, a computerized maintenance management system (CMMS) controller 270 controls a CMMS, an equipment performance tracking (EPT) controller 275 controls an EPT system, etc. In one embodiment, the strategy engine 235 acts as a supervisory system for the controllers.

The capabilities of each EES subsystem can be used cooperatively to achieve an optimal reconfiguration of the factory to support yield objectives. In one embodiment, interoperability between the controllers, the yield predictor 228, and/or other components of the manufacturing environment 222 is facilitated by adherence to flexible integration standards such as the semiconductor equipment and materials international (SEMI) E133 Process Control Systems (PCS) standard and web services (e.g., including web service calls). As an example of cooperative use of yield predictions, the strategy engine 235 may pass a yield prediction on to the R2R controller 260, the S/D controller 265 and the CMMS controller 270. The R2R controller 260 can used the yield prediction to determine what tools can be sufficiently modified to support a specific process change, and what the process change will mean in terms of cycle times, resource requirements, etc. This information can then be weighed by the strategy engine 235 against incoming order quantities and priorities as well as current work in progress (WIP) provided by the S/D controller 165. The CMMS controller 270 can then determine predictive maintenance Pareto's and projected timelines. Utilizing information from the R2R controller 260, the CMMS controller 270 and the S/D controller 265, the strategy engine 235 can determine an optimal solution per factory objectives. Such a determination may be made analytically through a weighted cost function, or heuristically through a set of workflow rules. The strategy engine 235 can then inform the three controllers of the production decision, and these controllers may adjust lower level control targets, predictive maintenance schedules and S/D decisions accordingly.

In one embodiment, the strategy engine 235 is an event-condition-action (ECA) strategy engine that provides a highly configurable and scalable mechanism for defining the collaborative utilization of resources in the manufacturing environment 200. An ECA strategy engine utilizes "control rules" that are triggered in response to events in the factory. These rules call on available resources in a sequence based on associated conditions to service events. For example, if a particular yield excursion event is detected, an ECA strategy engine may call a notification resource to inform a responsible engineer of the yield excursion event, call a maintenance system to request that a faulty manufacturing machine be scheduled for maintenance, call a scheduling/dispatch controller to suggest that WIP and especially hot-lots be scheduled around this tool, provide information to a R2R controller so that the "best" yield can be achieved with the tool until the tool is brought down for maintenance, etc.

In one embodiment, in which the strategy engine 235 is an ECA strategy engine, received yield prediction data includes a yield excursion event and one or more yield excursion conditions. The yield excursion event and yield excursion conditions may be used by the strategy engine 235 to take actions in response to the yield prediction. In a further embodiment, one of the yield excursion conditions is a yield prediction quality. Therefore, some actions may only be performed if a yield prediction of a specified yield prediction quality threshold is received.

Figure 4A:
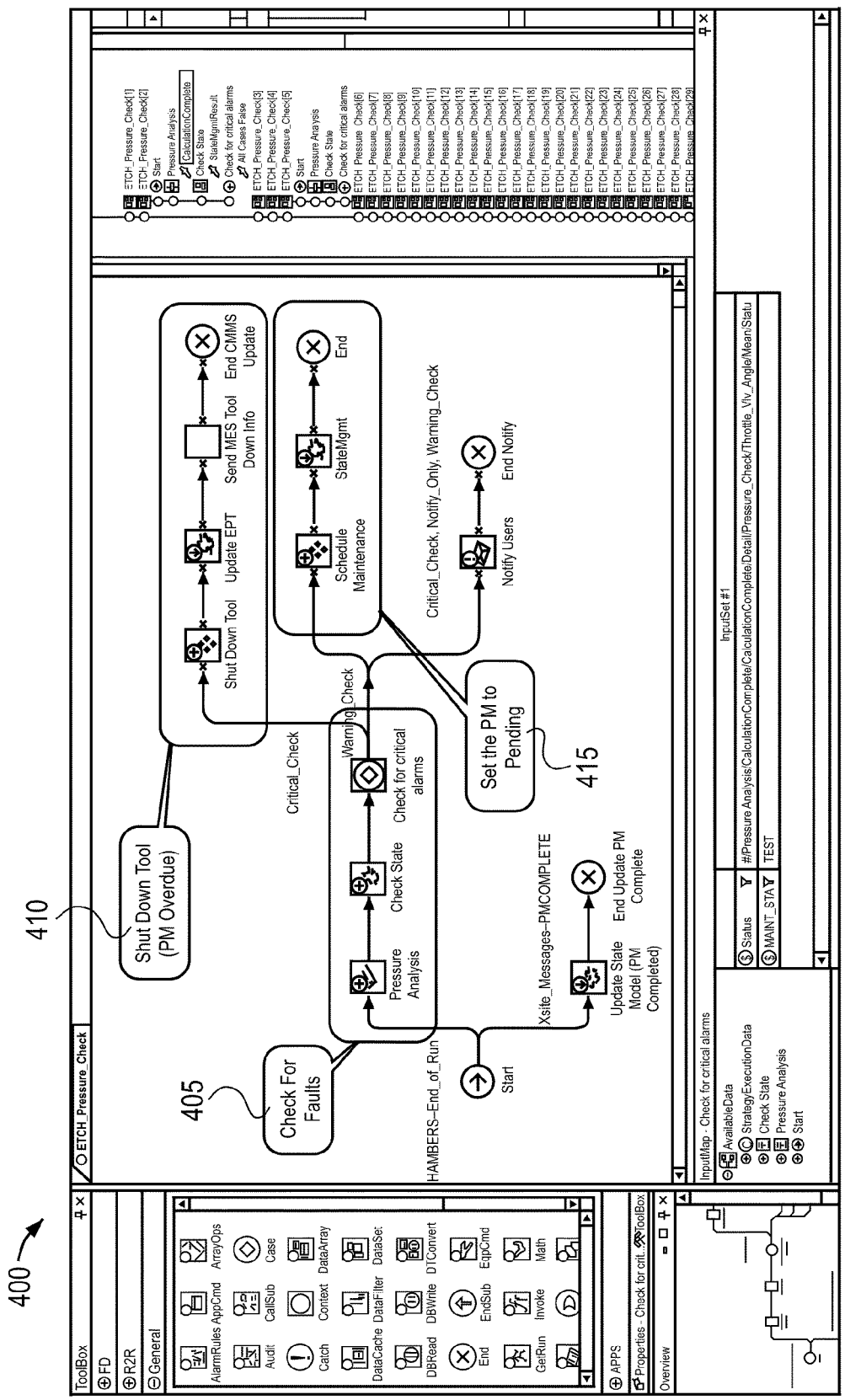
FIG. 4A illustrates a graphically configurable event-condition-action (ECA) strategy engine, in accordance with one embodiment of the present invention.

FIG. 4A illustrates a graphically configurable event-condition-action (ECA) strategy engine 400, in accordance with one embodiment of the present invention. The ECA strategy engine 400 includes a graphical drag-n-drop tool that allows for the easy development, visualization and reconfiguration of rules. Icons representing EES subsystem capabilities such as fault detection and scheduling maintenance can be dragged onto the workspace from the pallet at the left. The resulting "rules" define how the manufacturing environment operates in response to an event.

Figure 4B:
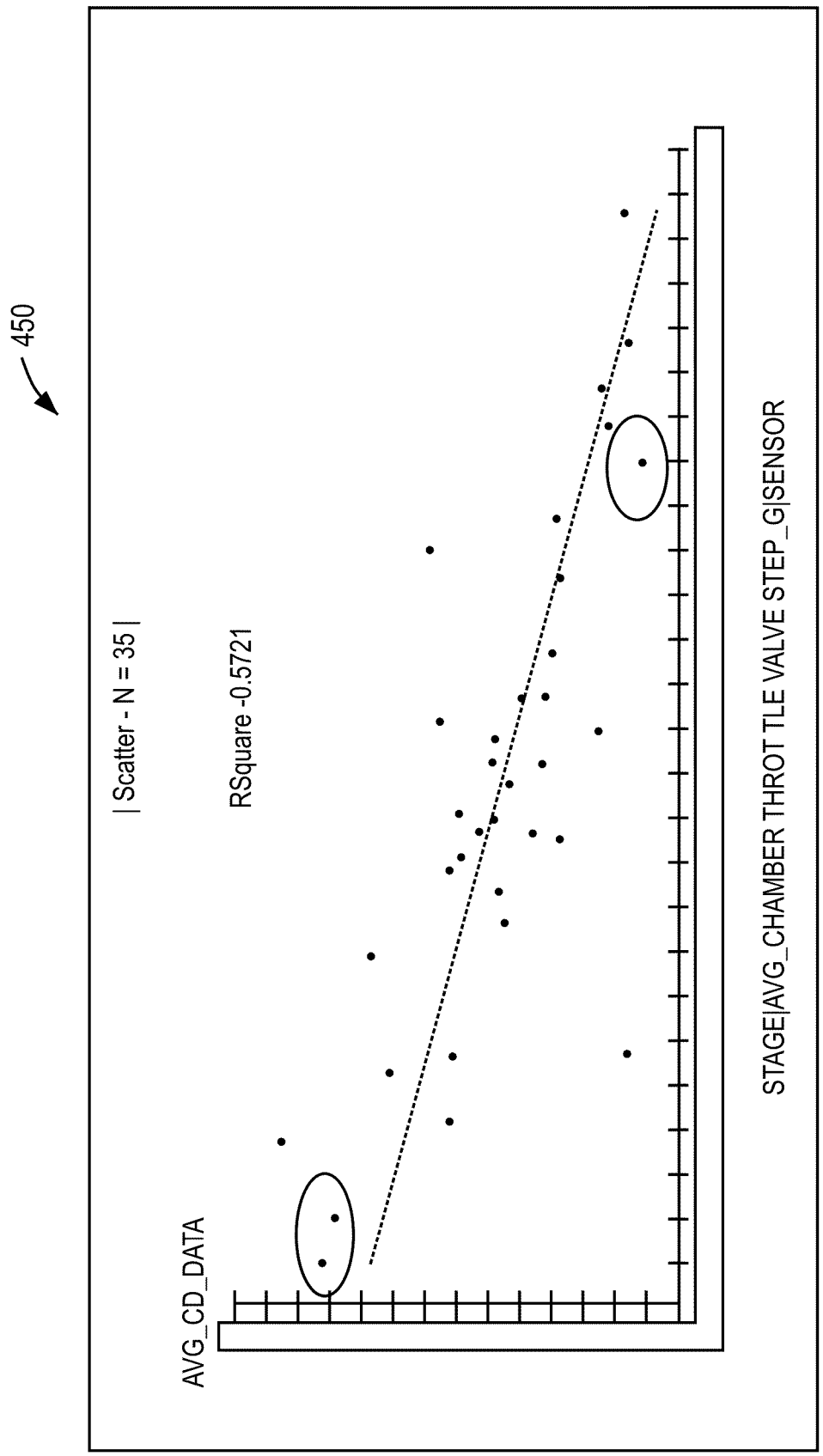
FIG. 4B illustrates example data for an etch pressure check that is used by the graphically configurable ECA strategy engine of FIG. 4A, in accordance with one embodiment of the present invention.

The interface 400 shows an example set of rules for an etch pressure check event whose data is shown in FIG. 4B. The illustrated set of rules first performs a fault check 405. The fault check 405 checks for one or more conditions by performing a pressure analysis, checking a tool state, and checking for any critical alarms. If a condition corresponding to a critical alarm is identified, the tool is shut down 410. Shutting down the tool 410 in the illustrated example includes updating an equipment performance tracking system, sending MES tool down information, and updating a CMMS system. If a condition corresponding to a warning alarm is identified, a PM is set to pending 415, which includes scheduling maintenance and managing a state of a manufacturing machine. Thus, utilization of ECA technology and a graphical ECA strategy engine enables users to define the interoperability of EES subsystems in a reconfigurable and non-programmatic way.

Returning to FIG. 2, when predetermined events occur and predetermined conditions are satisfied, the strategy engine performs one or a set of actions. These actions may occur simultaneously or in series. When certain actions are completed, feedback that results from the actions may be sent to the strategy engine, and subsequent actions may be performed based on the feedback.

In one embodiment, the strategy engine 235 performs an action by sending a command and/or information to a controller of a subsystem of the EES 205. The nature of the command and the type of information accompanying the command may depend on the controller to which the command and/or information is sent. For example, an identification of a manufacturing machine 280 that caused a yield excursion, a suggestion of probable causes of problems on the manufacturing machine 280, and instructions to schedule maintenance on the manufacturing machine 280 may be sent to the CMMS controller 270. At the same time, a performance metric that associates the manufacturing machine 280 to a predicted yield may be sent to the S/D controller 265, in response to which the S/D controller 265 can recalculate a cost/benefit analysis of processing product on the manufacturing machine 280 before the maintenance is performed. Other data and/or commands may also be sent to the R2R controller 260 to modify process recipes run on the manufacturing machine 280, to the EPT controller 275 to adjust an equipment performance tracking rating for the manufacturing machine 280, etc.

The run to run (R2R) controller 260 performs R2R control, which is defined as a technique of modifying recipe parameters or the selection of control parameters between process runs to improve processing performance. A 'run' can be a manufacturing process of a batch, lot, or an individual wafer. The R2R controller 260 can control any set of parameters that are relevant to the quality of the product being produced. Thus, parameters specific to a particular process such as CMP final thickness and final thickness uniformity, and more global parameters such as CD, CD uniformity, electrical characteristics, throughput, and yield may all be controlled by the R2R controller 260.

The R2R controller 260 utilizes dynamic models of the system, process and/or machine it is controlling to determine what parameters should be modified and how they should be modified. A R2R control model can be written in the form:

$$(Y_1, Y_2, \ldots, Y_i, \ldots, Y_m) = f(X_1, X_2, \ldots, X_j, \ldots, X_n) \quad (1)$$

where each $Y_i$ represents a quality variable output being controlled and each $X_j$ represents a quality variable input that can be tuned to provide that control.

In one embodiment, the R2R controller 260 includes multiple run to run (R2R) control modules (not shown). Each R2R control module can manage R2R control for a different process, set of processes, manufacturing tool, etc. For example, the R2R controller 260 may include a CMP R2R control module that manages a CMP process, an etch R2R control module that manages an etch process, and an inter-process R2R control module that manages uniformity control between the CMP process and the etch process. Therefore, the tunable inputs $X_j$ can be equipment settings in the traditional sense (e.g., process recipe parameters that control equipment settings, such as temperature, pressure, gas flow rates, etc.), and can also be less traditional parameters such as gains or targets of lower level R2R control modules.

In an example, the R2R controller may include a different R2R control module at two different processes, impacting the same feature that affects yield, but impacting that feature in different ways. The processes may be lithography followed by etch, with the feature being critical dimension (CD). In this scenario there may be a CD patterning step at lithography followed by an etchback process step at etch. These two processes are linked in that a pattern is set up in lithography so that an opening can be "etched back" a certain amount at etch to hit a critical dimension (CD) target. Both process are controlled utilizing R2R control. In this example, the etchback step introduces variability in the CD with respect to target, but provides an opportunity for radial uniformity control of CD (i.e., minimization of the difference in CD between the center of the wafer and the outer edge. In general, the longer the controlled etchback step, the higher the variability of CD with respect to target, but the better the center-to-edge CD uniformity.

Figure 5A:
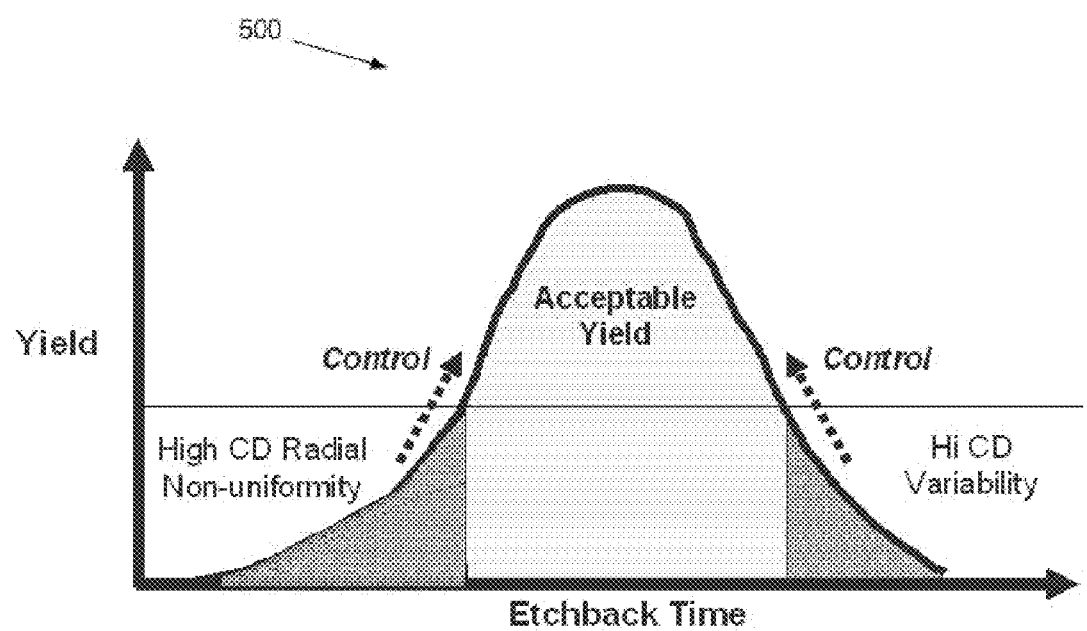
FIG. 5A illustrates a yield distribution plot showing yield verses etchback time, in accordance with one embodiment of the present invention.

FIG. 5A illustrates a yield distribution plot 500 showing yield verses etchback time, in accordance with one embodiment of the present invention. Wafers entering the lithography process may have an incoming variability and uniformity. Yield may be a function of closeness of CD to target. Thus, based on predicted yield, we can adjust our litho CD target and etchback targets to get the balance between CD variability and CD uniformity, thereby improving yield, as shown in FIG. 5A. Specifically, from predictions of yield loss profiles across wafer, the system adjusts our targeting of the etchback size (and thus time) to improve yield. For example if the prediction shows sporadic across-wafer yield loss, then lower the etchback amount (for lower variability); if the prediction shows yield loss at the center and outside (suggesting a uniformity issue) then increase the etchback amount (for lower non-uniformity).

The two example R2R control modules may operate according to the following equations:

General, Wafer $$CDslope = (CDcenter - CDedge)/150 \text{ mm} \quad (2)$$

$$CDvariation = CDmax - CDmin, \text{ distributed uniformly (for simplicity)} \quad (3)$$

$$CDproduct = \text{the final CD specified for the product} \quad (4)$$

At Lithography $$CDave\text{-}postlitho = (CONSTcd\text{-}litho + ExposeRate*ExposeTime)nm \quad (5)$$

$$CDtargetlitho = CDtargetpostetch - CDetchbacktarget \quad (6)$$

$$CDslope\text{-}prelitho = CDslope\text{-}postlitho \text{ (uniformity not impacted by litho)} \quad (7)$$

$$CDvariation\text{-}prelitho = CDvariation\text{-}postlitho \text{ (variability not impacted by litho)} \quad (8)$$

At Etch $$CDslope\text{-}postetch = CDslope\text{-}postlitho - RATEdifferential\text{-}etch \times TIMEetch \quad (9)$$

$$CDave\text{-}postetch = CDave\text{-}postlitho + RATEetch \times TIMEetch \quad (10)$$

$$CDvariation\text{-}postetch = CDvariation\text{-}postlitho + (VARIATIONetch \times TIMEetch) \quad (11)$$

Yield Prediction $$\text{If } (CDupperlimit = <CDpostetch = <CDlowerlimit \text{ then } DieYield = = TRUE \text{ Else } DieYield = = FALSE \quad (12)$$

$$0 = <YieldPredConfidence = <1 \quad (13)$$

Where Die yield will be a function of the CDpostetch for that die, which is a function of CDave postetch and CDvariation-postetch, and die yield is a yes/no determination.

In one embodiment, equations (2) through (11) are used to estimate wafer parameters and do not have to involve controller parameters. An example of a system that uses these equations could be implemented is as follows (where "block" refers to a module in the implementation):

A. Set up a data input block with settable variables of CDslope-prelitho (or CDcenter-prelitho and CDedge-prelitho), CDvariation-prelitho, CDproduct (the initial target CD)

B. Set up a lithography tool model block that implements equations (5)-(8). CONSTcd-litho, ExposeRate, and CDetchbacktarget are constants or need to have initial values here so that will be settable (or have them in the input block above). Initially have CDtargetpostetch==CDproduct. Initially calculate ExposureTime so that CDave-postlitho==CDtargetlitho C. Set up an etch tool model block that implements equations (9)-(11). RATEdifferential-etch, RATEetch and VARIATIONetch are constants or need to have initial values here so that will be settable (or have them in the input block above). Initially calculate TIMEetch so that CDave-postetch=CDproduct.

D. Set up a Yield prediction block that utilizes the CDslope-postetch, CDave-postetch and CDvariation-postetch values from the etch block to determine which die are good/bad. CDupperlimit, CDlowerlimit and YieldPred-Confidence are constants or need to have initial values here so that will be settable (or have them in the input block above). Take the etch block output CD values. Predict a CD for each of the die as follows:
  a. One Center die: CD1=CDave-postetch+[(CDslope-postetch×(75−0)]+CDvariation×[UNIF(0,1)−0.5]
  b. Four die around center: CD2=CDave-postetch+[CDslope-postetch×(75−50)]+{CDvariation×[UNIF(0,1)−0.5]} c. Eight die in middle: CD3=CDave-postetch+[CDslope-postetch×(75−100)]+{CDvariation×[UNIF(0,1)−0.5]} d. Sixteen die around edge: CD4=CDave-postetch+[CDslope-postetch×(75−150)]+{CDvariation×[UNIF(0,1)−0.5]}

The yield of each die on the processed wafer can be predicted. A comparative yield analysis of each ring of dies on the wafer can then be performed. A yield feedback logic (e.g., the R2R controller) can then execute the feedback rules and determine what adjustments to the control environment should be made (e.g., increase the etchback size target if analysis indicates that radial non-uniformity is the primary source of yield loss).

Specifically, in the above example the yield analysis block may produce the yield prediction feedback to the R2R control systems that makes changes to the control environment based on the predicted yield and prediction confidence. Examples of rules that might be implemented in this block are:

A. IF yield loss<YL-upperthreshold THEN do nothing, ELSE

B. IF yield loss=variable THEN decrease CDetchbacktarget
   a. The etch tool is adding too much variability, while uniformity is not a problem, so pull back on the etch step; the amount is dependent on the confidence of the prediction and an EWMA weighting factor.

C. IF yield loss at center and edge THEN increase CDetchbacktarget
   a. Uniformity control is problem and the etch tool needs more time to do its job; the amount is dependent on the confidence of the prediction and an EWMA weighting factor.

D. IF yield loss at center rings only THEN increase CDtarget-postetch
   a. This is more complicated; assuming the yield loss is a one sided distribution, the system re-centers the target to try and get all of the die within the limits for acceptable yield.

E. IF yield loss at edge rings only THEN decrease CDtarget-postetch
   a. Same idea, but profile is shifted the other way.

In the above described example, two initial system conditions were considered, namely (1) a controlled process that had low variability, but high radial non-uniformity, and (2) a controlled process that has low radial non-uniformity and high variability. In both cases the yield of the wafer was calculated for die in concentric rings.

Figure 5B:
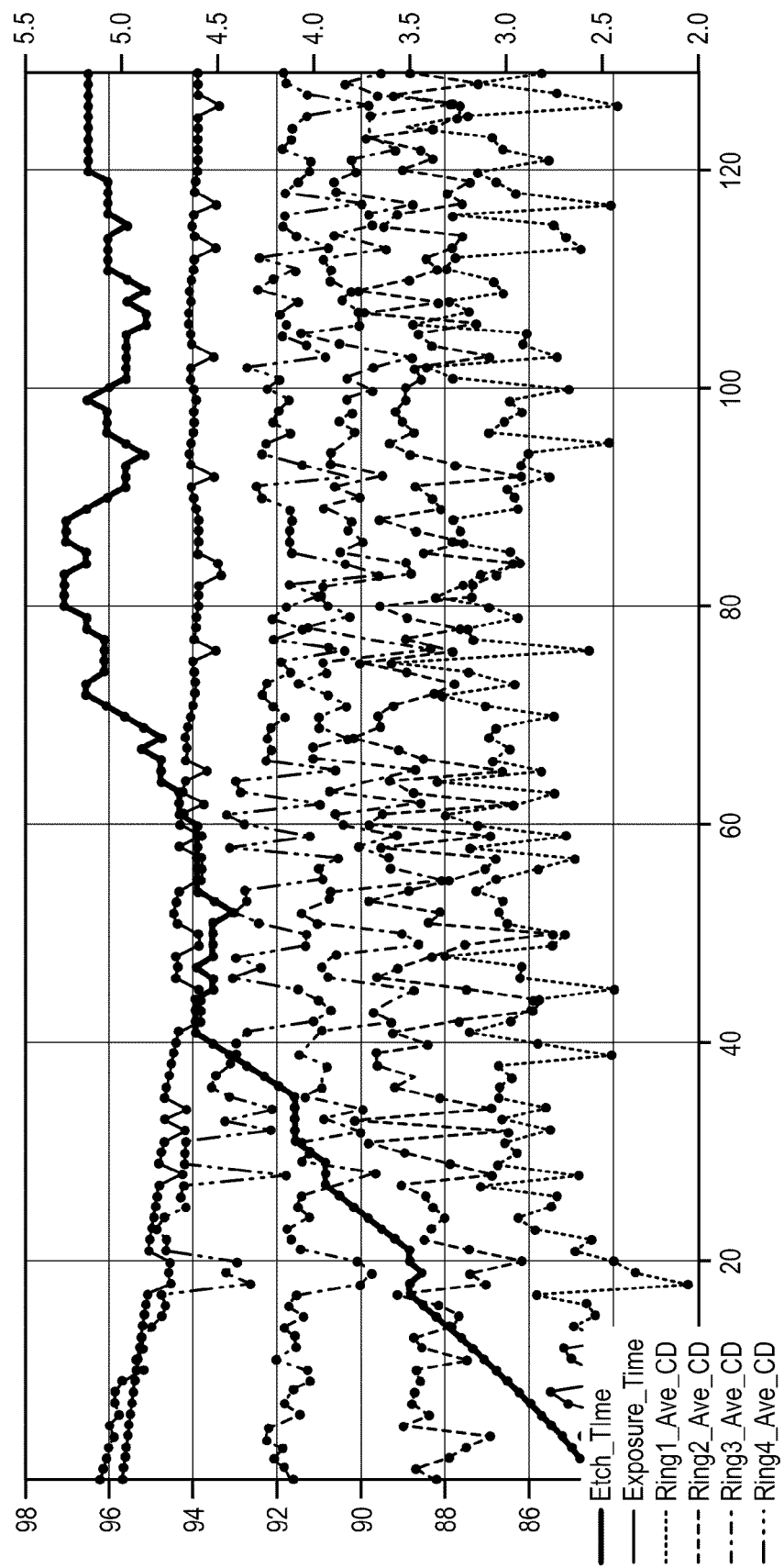
FIGS. 5B-5E illustrate example yield results, in accordance with embodiments of the present invention.
Figure 5C:
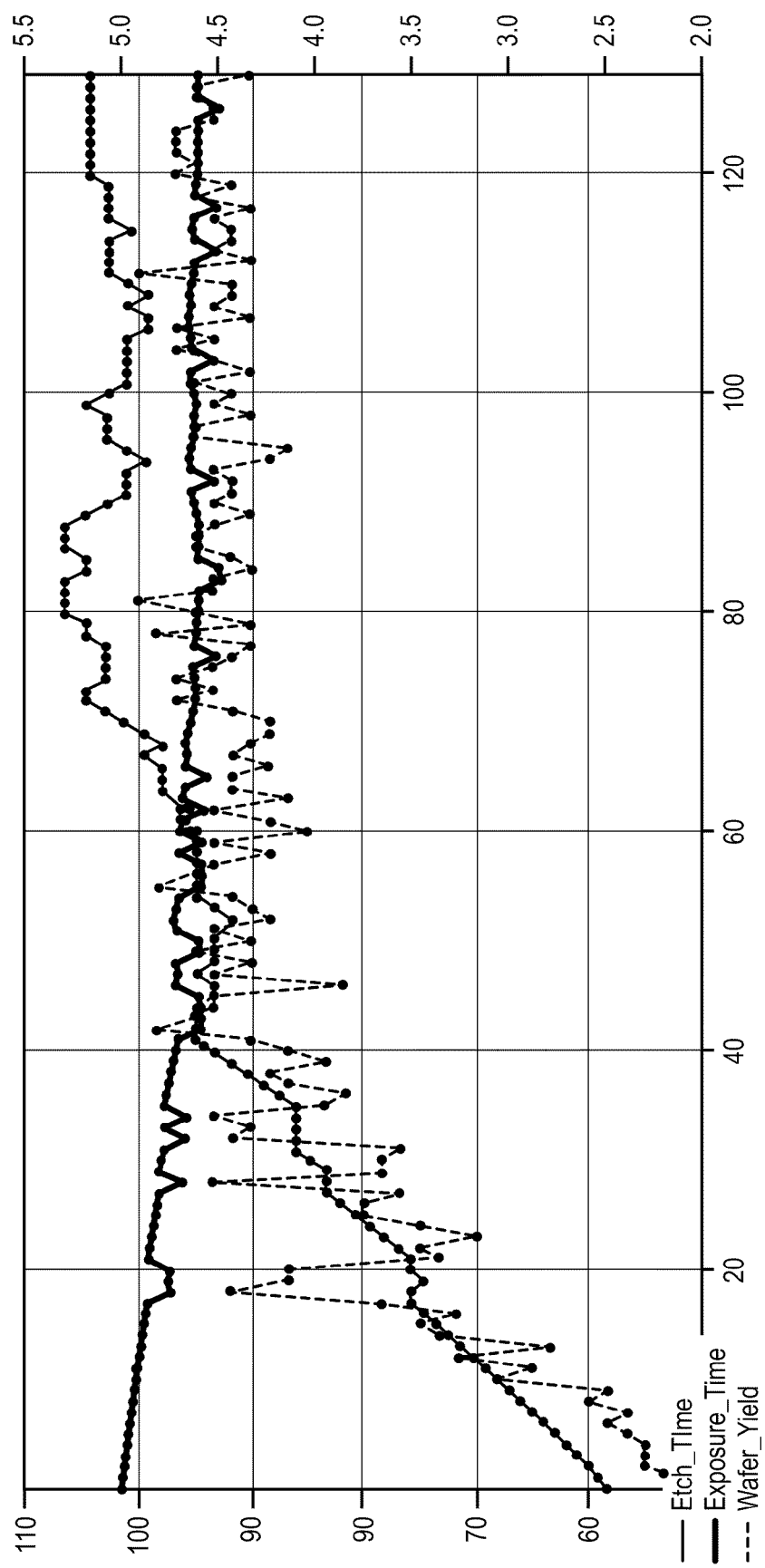

FIGS. 5B-5E illustrate example yield results based on the above described example. The results of the yield prediction feedback (making adjustments to R2R control parameters based on yield predictions) applied to an etchback controlled process that had low variability, but high radial non-uniformity are shown in FIGS. 5B and 5C. FIG. 5B illustrates that the etchback target is increased (and subsequently etch time is increased) resulting in improved radial non-uniformity, i.e., the distribution of the average CD among the rings decreases. At the same time however, the CD variability within each ring increases. Eventually satisfactory yield levels are reached and the adjustments in etchback target diminish. FIG. 5C illustrates the evolution of etchback time, lithography exposure time, and yield for this example. As illustrated, the lithography exposure time decreases as the etchback time increases. Also, as illustrated the yield increases (as balance between non-uniformity and variability of CD improves) until a satisfactory level is reached. Note that this control process is equivalent of traversing up the left side of the curve of FIG. 5A.

Figure 5D:
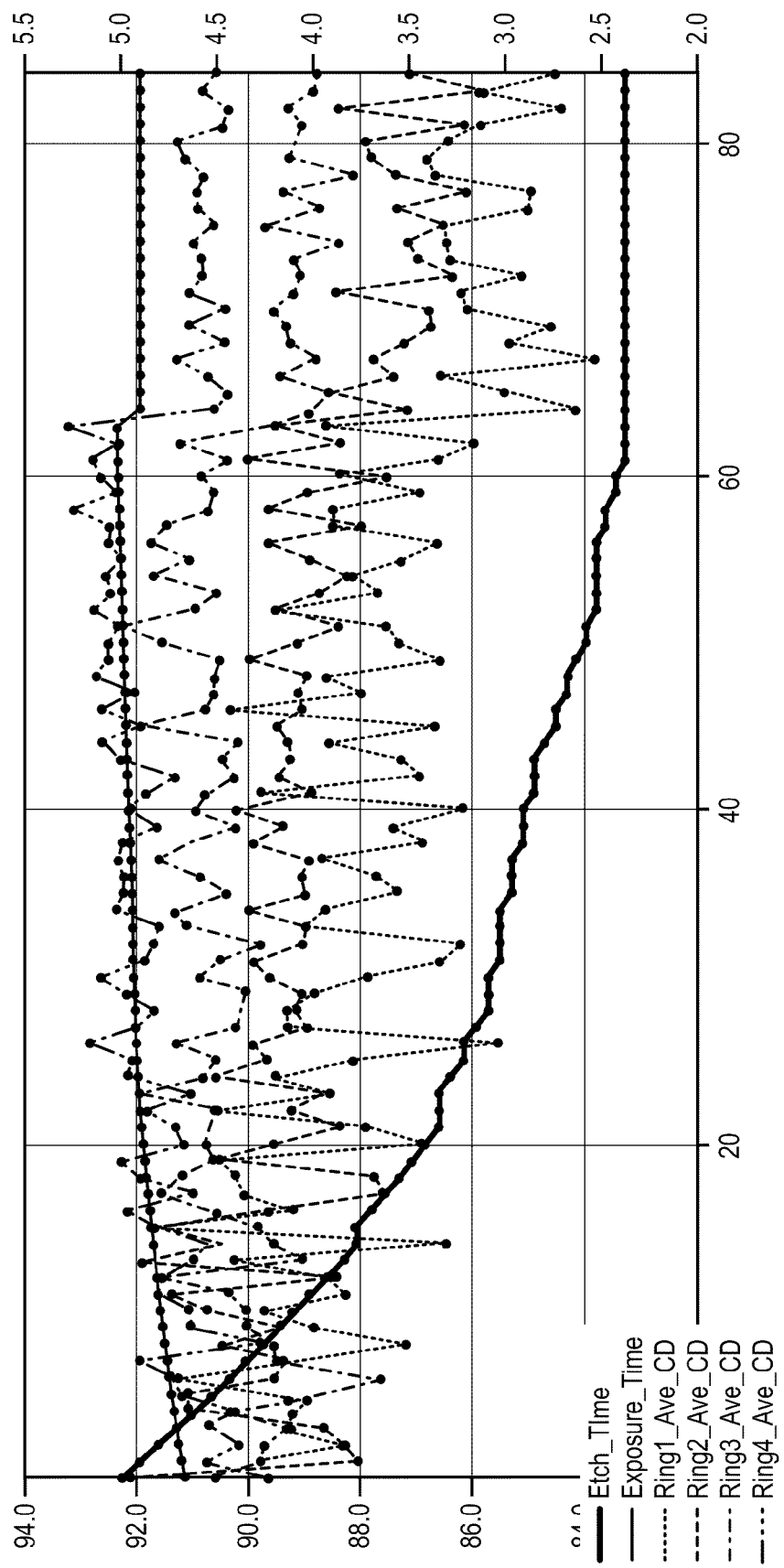
Figure 5E:
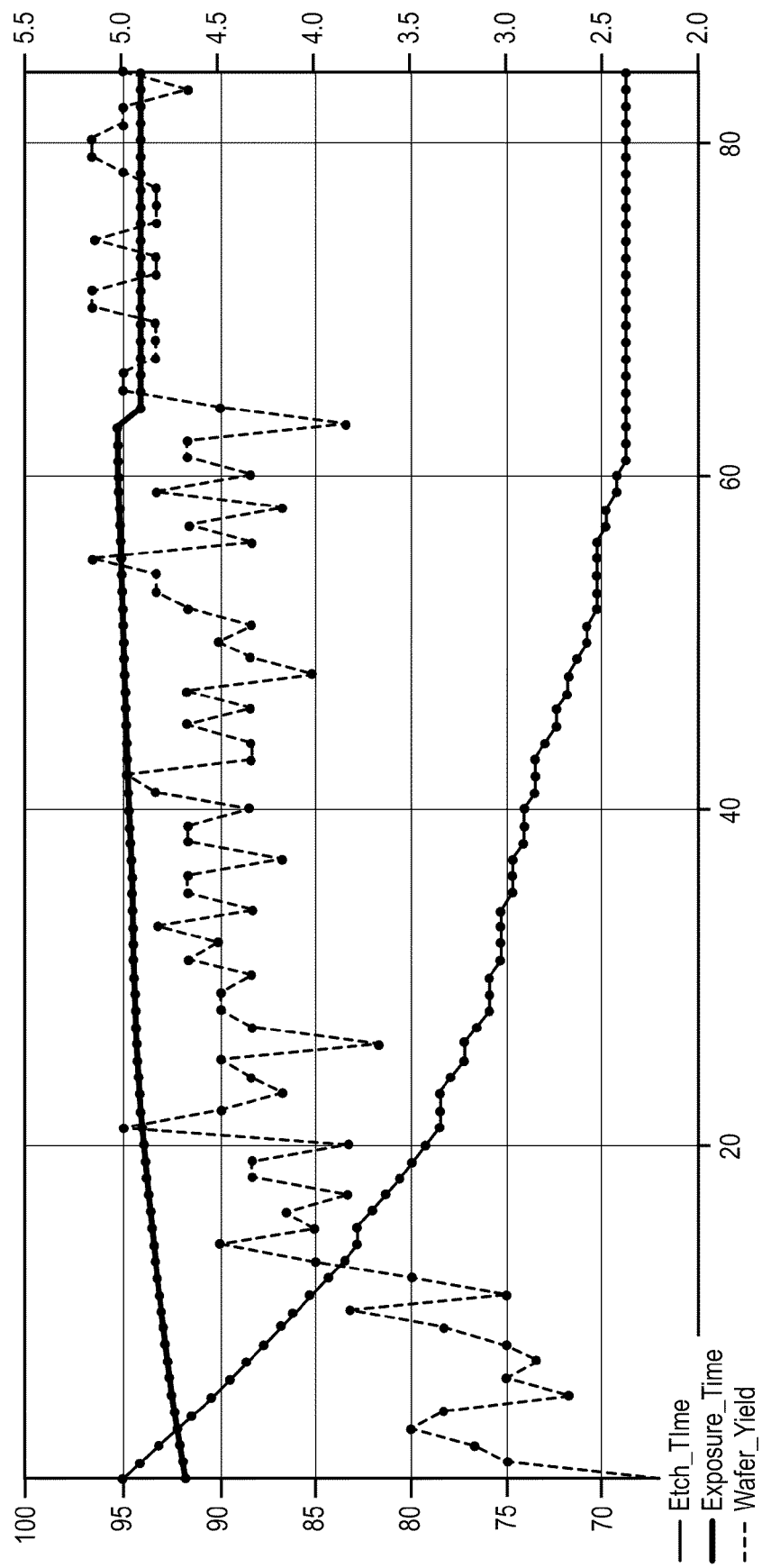

The results of yield prediction feedback applied an etchback controlled process that had low non-uniformity, but high variability are shown in FIGS. 5D-5E. FIG. 5D illustrates that the etchback target is decreased (and subsequently etch time is decreased) resulting in lower variability in each ring. However, at the same time distribution of average CD among the rings increases, indicating that non-uniformity is increasing. Eventually satisfactory yield levels are reached and the adjustments in etchback target diminish. FIG. 5E illustrates the evolution of etchback time, lithography exposure time, and yield for this example. As shown, the lithography exposure time increases as the etchback time decreases. Also, as shown the yield increases (as balance between non-uniformity and variability of CD improves) until a satisfactory level is reached. Note that this control process is equivalent of traversing up the right side of the curve of FIG. 5A.

In one embodiment, the R2R controller 260 includes three levels of R2R control modules: a factory level R2R control module, inter-process R2R control modules, and intra-process R2R control modules. For example, an inter-process R2R control module managing uniformity control between a CMP tool and an etch tool may tune the target ($Y_i$ parameter) of the CMP R2R control module in response to the quality uniformity output of the etch tool. Thus, the inter-process R2R control module may cause CMP settings to be modified to pre-compensate for etch process non-uniformity. In one embodiment, the outputs and/or inputs of the R2R control modules are weighted, e.g., so that the quality can be a weighted objective function.

Figure 5F:
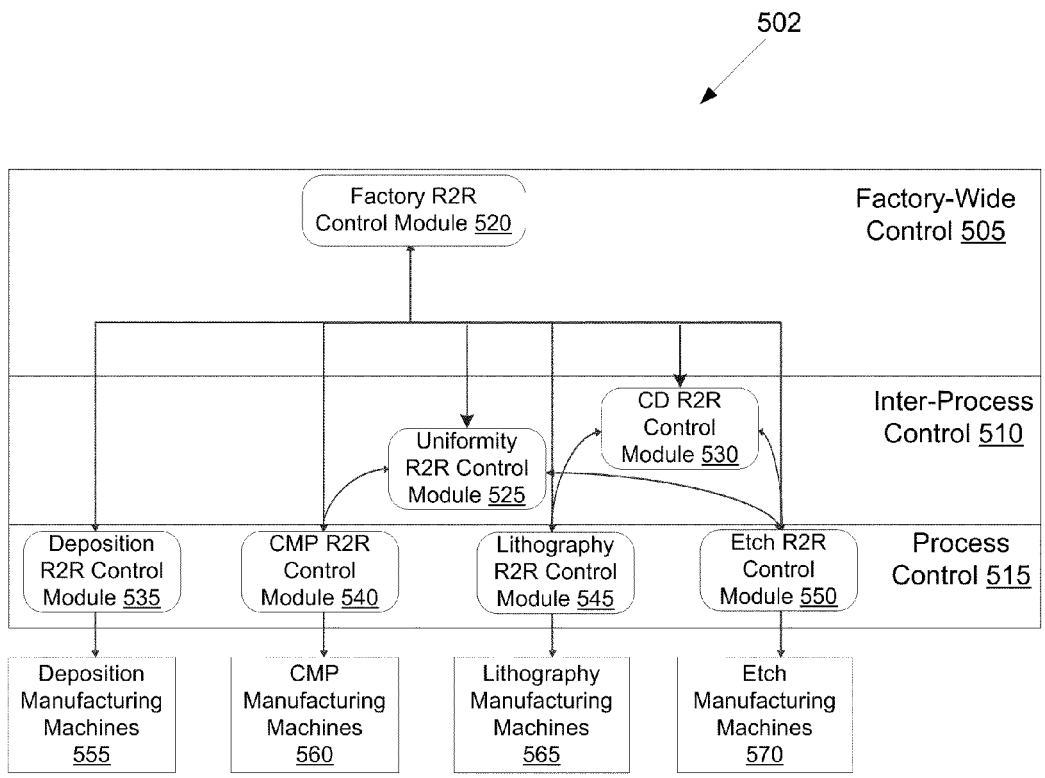
FIG. 5F illustrates one embodiment of a hierarchical arrangement of R2R control modules.

FIG. 5F illustrates one embodiment of a hierarchical arrangement 502 of R2R control modules. The hierarchical arrangement of R2R control modules provides for factory-wide control 505 of factory level quality parameters, inter-process control 510 of inter-process level quality parameters and process control 515 of intra-process level quality parameters.

The objectives of the lower level control modules may not always coincide with the objectives of the higher level control modules. For example, improvement of uniformity at a CMP tool does not necessarily guarantee improvement of line yield. Thus, in one embodiment an optimal configuration of a factory-wide R2R control system enables higher level control modules to tune parameters of lower level control modules as part of their control and/or optimization functionality.

In one embodiment, at the highest level of R2R control, the quality parameters include one or more yield indicators. This allows yield issues to be addressed directly with process control rather than through process and design change. Yield predictors may be chosen to coincide with yield quality parameters of the highest level R2R control module(s). Since yield predictions are made from fault detection and classification data provided during processing of actual product, the predicted yield information is available to the controller at a R2R control frequency (e.g., new data is available whenever a product is processed or measured). This allows for automated multi-level R2R control of yield parameters to be supported. Note that the yield prediction at each step of production can be utilized to tune the (sub-level) control parameters associated with the step of production, and can also be utilized to tune controllers to support downstream correction (e.g., correction of a subsequent step), or provide other control decisions that would aid in improving yield for current and future process runs.

In one embodiment, a factory R2R control module 520 provides factory level control for a product or product family. When new fault detection and classification data and/or a new yield prediction is received, the factory R2R control module 520 can adjust high level parameters to improve the predicted yield. These adjustments may modify targets and/or settings of one or more inter-process level control modules (e.g., the uniformity R2R control module 525, the CD R2R control module 530, etc.) and/or process level control modules (e.g., the deposition R2R control module 535, the CMP R2R control module 540, the lithography R2R control module 545, the etch R2R control module 550, etc.). In turn, the inter-process level control modules can adjust parameters to coincide with new targets and/or settings provided by the factory R2R control module 520, which may cause further changes to targets and/or settings of the process level control modules. The process level R2R control modules may then adjust parameters of individual recipes, manufacturing machines, etc. in response to the new targets and settings. For example, the deposition R2R control module 535 may adjust parameters of one or more deposition manufacturing machines, the CMP R2R control module 540 may adjust parameters of one or more CMP manufacturing machines 560, etc.

In one embodiment, an inter-process level uniformity R2R control module 525 controls uniformity between CMP and etch processes. The uniformity R2R control module 525 adjusts CD targets, controller gains, and weighting of objective parameters (outputs) of the CMP R2R control module 540 and the etch R2R control module 550 so as to control post-etch CD. The uniformity R2R control module 525 receives one or more actions caused by a predicted yield excursion event that predicts that post-lithography there will be a yield issue due to lack of CD uniformity. The uniformity R2R control module 525 adjusts the targeting and weighting of the uniformity objective for the subsequent etch R2R control module 550. In response, the etch R2R control module 550 adjusts recipe parameters on an etch machine 570 to bring them in line with the new targeting and weighting, thus preventing yield loss due to CD non-uniformity.

Note that, as with any prediction system, the quality of the yield prediction is important. In one embodiment, the R2R controller (including all R2R control modules) takes yield prediction quality into account, and adjusts the weighting for control of the yield parameters accordingly. Techniques utilized for virtual metrology enhanced R2R control may be leveraged to perform such weighting.

Returning to FIG. 2, the S/D controller 265 uses information on production orders from ERP systems (cost, quantity, etc.), product process flow requirements, tool availability, product yield associated with manufacturing machines and/or product, and throughput requirements to determine scheduling and dispatch for each of the manufacturing machines 280 in the manufacturing environment 222. The S/D controller 265 applies such information to a scheduling and dispatch policy (S/D policy) that controls the assignment of product to manufacturing machines 280. In one embodiment, the S/D controller 265 can dynamically and adaptively re-route product to continually optimize the manufacturing environment 222 from a scheduling perspective. Dynamic adjustments include adjustments that are made to the S/D policy on-line, while manufacturing is occurring. Adaptive adjustments include adjustments that are made based on feedback information (e.g., yield prediction) to provide an optimization of the S/D policy towards a specified optimization function.

In one embodiment, the ultimate objective of the S/D policy is to optimize factory profit. There is a profit associated with delivery of product that has acceptable yield to a customer. There are costs associated with scrap (wafers with unacceptable yield) as well as penalties for delivery of product behind schedule. Therefore, it is a goal of the S/D policy to deliver a maximum number of high yield product in a minimum amount of time.

The S/D controller 165 may initially consider dispatching product to all manufacturing machines capable of performing a particular process on a product. The S/D controller 165 may eliminate from consideration some manufacturing machines based on one or more deterministic dispatch rules. For example, manufacturing machines that are under maintenance or otherwise not functional may automatically be removed from consideration. Manufacturing machines that already have a queue of a predefined length (e.g., 2 lots) may also be removed from consideration. Alternatively, the queues for manufacturing machines that have the predefined length may be altered (e.g., by removing a product from the queue). In such an embodiment, manufacturing machines having the predefined queue length may not be removed from consideration.

Once certain manufacturing machines have been disqualified (removed from consideration), a dispatch score is determined for each remaining manufacturing machine (e.g., for n remaining candidate manufacturing machines) using a scoring algorithm. The scoring algorithm may include factors that are associated with the product (e.g., priority, cost of scrap, product process flow requirements, predicted yield associated with product, etc.), factors that are associated with the manufacturing machine (e.g., cycle time, process capability, predicted yield associated with equipment, tool availability, etc.), and/or factors that are associated with an interplay between the products and the manufacturing machines (e.g., queue length, throughput requirements, predicted yield associated with processing product on equipment). The factors in the scoring may or may not be normalized.

By incorporating yield prediction as a factor into the S/D policy, the S/D policy can be optimized to increase net profit. As mentioned above, yield predictions can be associated with a degree of confidence for the prediction. In one embodiment, the greater the confidence of a yield prediction, the more heavily the yield prediction is weighted in the scoring algorithm.

In one embodiment, a different scoring algorithm is used for each product. The scoring algorithm for each product can be optimized based on factors that are specific to that product. For example, a penalty for not finishing one product on time may be higher than a penalty for not finishing another product on time. Accordingly, the product having the higher penalty may have a higher weight for a queue delay cost factor. In one embodiment, for each manufacturing machine a dispatch score is calculated based on a number of weighted factors. A weighted score algorithm in one embodiment is normalized as follows:

$$Score_{Tool} = \frac{W_1}{\sum_{i=1}^{n} W_i} \cdot Factor_1 + \frac{W_2}{\sum_{i=1}^{n} W_i} \cdot Factor_2 + \ldots + \frac{W_n}{\sum_{i=1}^{n} W_i} \cdot Factor_n \quad (14)$$

Where $W_1$ through $W_n$ are weights that are applied to factors 1 through n for a particular product, and where tool represents a particular manufacturing machine for which the dispatch score is calculated.

In one embodiment, the factors included in the scoring algorithm are cycle time cost, down time cost, process capability cost, queuing delay cost and yield related cost. The factors may be calculated according to the following equations:

$$Factor_1 = CycleTimeCost \qquad (15)$$
$$= \frac{CycleTime_{tool} - CycleTime_{Avg}}{CycleTime_{Avg}}$$

$$Factor_2 = DownTimeCost \qquad (16)$$
$$= \frac{DownTime_{tool} - DownTime_{Avg}}{DownTime_{Avg}}$$

$$Factor_3 = ProcessCapabilityCost \qquad (17)$$
$$= \frac{Cpk_{Avgl} - Cpk_{Tool}}{Cpk_{Avg}}$$

$$Factor_4 = QueuingDelayCost \qquad (18)$$
$$= \frac{Q_{Avg} - Q_{Tool}}{Q_{Avg}}$$

$$Factor_5 = YieldRelativeBenefit \qquad (19)$$
$$= \frac{Yield_{tool} - Yield_{Avg}}{Yield_{Avg}}$$

Where tool represents a value associated with a particular manufacturing machine, and avg represents the average value across all manufacturing machines of a particular type.

For all of these factors, the components that go into the calculations can be chosen as constants for each tool, except for queuing delay. This is because queuing delay is dependent on how many lots are dispatched to a particular tool at a particular time. Use of the yield factor (based on yield prediction) in the S/D analysis gives a higher gross profit than can be achieved without use of the yield factor.

In one embodiment, the S/D controller 165 solves three scheduling problems. First, when a lot is available to be processed, which manufacturing machine's queue should it enter? Second, when a manufacturing machine is ready to process product, which product in its queue should it process? Third, when a queue of a manufacturing machine is empty, which of the product not queued should be queued at this manufacturing machine? These three problems can be solved by the S/D controller 165 by comparing dispatch scores that have been generated for each manufacturing machine and for each product. In one embodiment, a separate dispatch score is generated for each combination of a product and a manufacturing machine. Products may then be scheduled to manufacturing machines to maximize total dispatch scores.

In solving the first problem, each manufacturing machine that is available (i.e., its queue is not full) is evaluated utilizing equation (1) utilizing the factor weights associated with product to be processed. In solving the second and third problems, the factor weights associated with particular product are used to differentiate the products in the equipment queue or waiting to be queued to determine the optimal product that is to be next processed or next queued for a particular manufacturing machine.

With this problem setup the analysis may proceed as follows: determine product and equipment constant information that will impact the S/D policy; calculate optimal weights for maximizing profit; and apply scoring analysis to get a dispatch strategy. The dispatch strategy for one lot may impact the next lot from the perspective of recalculation of the queue information. The above analysis enables calculation of the optimal factory profit, taking into consideration the yield prediction information.

In one embodiment, the first problem, second problem and third problem are solved using a routing algorithm. The routing algorithm includes the scoring algorithm. Therefore, the routing algorithm can calculate dispatch scores for each combination of product and manufacturing machine, and then determine what product to assign to which manufacturing machines based on the dispatch scores.

TABLE 1

Product Table

| Part | Rate/Day | Revenue | ScrapCost | LateCost |
|------|----------|---------|-----------|----------|
| P1 | 200 | 1000 | 200 | 250 |
| P2 | 10 | 5000 | 1000 | 1000 |
| P3 | 50 | 2000 | 400 | 500 |

TABLE 2

Manufacturing Machine Table

| Eqp | CycleTime | AvgDown | ProcessQuality | Yield |
|-----|-----------|---------|----------------|-------|
| E1 | 24:00 | 7% | 95 | 99% |
| E2 | 22:00 | 6% | 97 | 95% |
| E3 | 20:00 | 5% | 100 | 90% |

Table 1 and Table 2 provide example equipment and product attributes. Note that there are three products (P1, P2 and P3 shown in table 2) and three manufacturing machines (E1, E2 and E3 shown in table 3). For each product, desired production rate, revenue, cost per scrap and "late cost" penalty per day are all indicated on a per lot basis. For each manufacturing machine, values for cycle time, down time, process quality (i.e., process capability) and yield are indicated. Product rates per day, profits and costs associated with product, and equipment attributes that relate to the S/D policy decision process are all dictated. Queue length is not provided here as a constant because, as noted above, it is a variable that results from the interplay between product and equipment and is a function of the S/D policy chosen. With this information, the factor weights can be determined for the various factors applied to the various parts.

TABLE 3

Part Factor Weights

| Part | P1 | P1 | P1 | P1 | P1 | P2 | P2 | P2 | P2 | P2 | P3 | P3 | P3 | P3 | P3 |
|------|----|----|----|----|----|----|----|----|----|----|----|----|----|----|----|
| Factor | Ct | Up | Cp | Q | Y | Ct | Up | Cp | Q | Y | Ct | Up | Cp | Q | Y |
| Weight | 3.2 | 9.1 | 0 | 2.7 | 2.2 | .25 | 4.5 | 0 | 8.1 | 8 | .4 | 1.9 | 0 | 6.8 | 3.6 |

Table 3 shows example computed optimal weights for each of the three products. In table 3, Ct represents cycle time, Up represents up time, Cp represents process capability, Q represents queuing delay, and Y represents predicted yield. As is shown in table 1, P2 has the highest cost for scrap. Accordingly, P2 assigns the highest weight to predicted yield as opposed to P1 and P3.

Figure 5G:
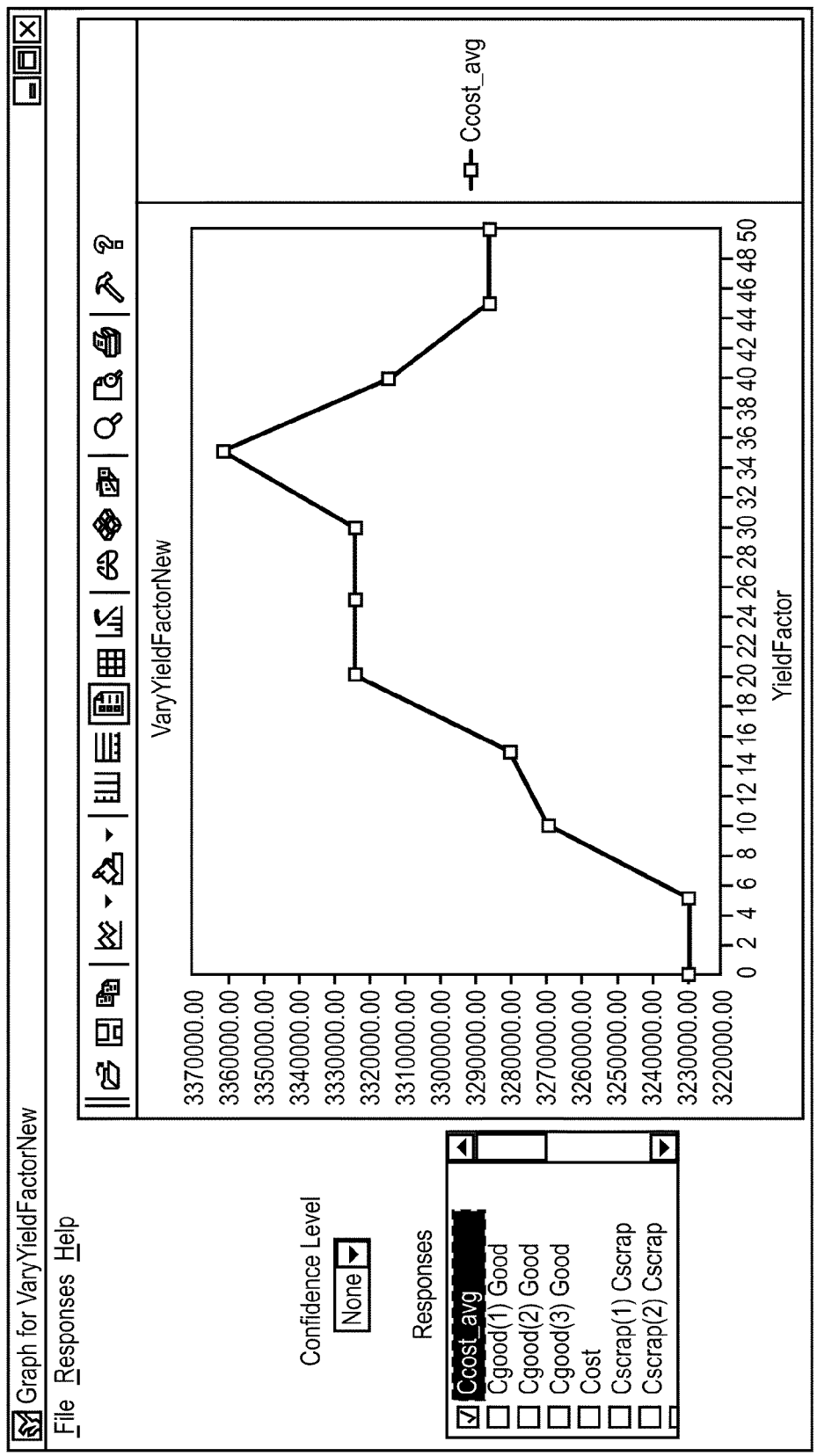
FIG. 5G illustrates a plot that shows factory profit as a function of the yield factor weight, in accordance with one embodiment of the present invention.

FIG. 5G illustrates a plot that shows factory profit as a function of the yield factor weight, in accordance with one embodiment of the present invention. Yield factor is shown along the horizontal axis, and factory profit is shown along the vertical axis. As illustrated, if the yield factor weight is set to 0 (yield prediction is not considered by the S/D controller), the factory profit is $3,230,000 per day. In the illustrated example, as the yield factor weight is increased to 36, profit rises to a maximum of $3,360,000 per day. As the yield factor weight is increased beyond 36, factory profit declines. This illustrates the potentially significant benefit that using yield prediction to make S/D decisions can provide. Note that as the accuracy of the yield prediction decreases, the optimal weighting of the yield factor would likely decrease, however a profit benefit over a solution with no yield information would still be observed.

As new yield prediction information is received, the S/D controller 265 may update dispatch assignments of product to equipment. For example, if the yield predictor 228 is predicting that product 'A' will have a 4% yield hit when sent to tool Litho-1, but only a 2% hit if sent to tool Litho-2, the S/D controller 265 could have a rule that incorporates that information along with information on WIP ahead of these tools as well as just-in-time (JIT) production information to make "yield conscious" S/D decisions. This rule could be a prioritized tree structure for making decisions, or could be a weighted calculation of the opportunity cost of sending the lot to Litho-1 versus Litho-2. Since the yield prediction information is available in real-time, the S/D controller 265 can utilize this information to make real-time S/D decisions.

The CMMS controller 270 maintains maintenance schedules and maintenance histories, current statuses of manufacturing machines and metrology tools, and information on any additional maintenance operations within the manufacturing environment 222. The CMMS controller 270 may schedule maintenance events based on timing, part count (e.g., wafers processed), and/or events received such as tool alarms. Such maintenance events may include, taking a manufacturing machine out of production, assigning personnel to service the manufacturing machine, reserving materials, recording costs, tracking relevant information such as a cause of the problem (e.g., including associating the cause to a yield excursion event), etc.

In one embodiment, actual yield excursions are tied to maintenance events in a yield prediction model used by the yield predictor 228. Such a yield prediction model may have been generated by comparing historical yield data with historical maintenance data to determine the correlation between specific yield excursion modes and subsequent maintenance modes. With such a model in place, the yield prediction can be utilized by the CMMS controller 270 to trigger a maintenance event.

The EPT subsystem enables the EES to track basic equipment performance automatically without operator or host input. The EPT subsystem provides automatic reporting of equipment state changes, time in a state, and reasons why a particular piece of equipment is in the state (e.g., reasons why a piece of equipment is blocked from performing a task). Equipment states can include waiting for a product, available, processing product, in maintenance, blocked from performing a particular task, etc. Yield prediction information can be integrated into the EPT subsystem to provide greater information as to why a piece of equipment (e.g., a manufacturing machine 280) is in a particular state (e.g., why the piece of equipment is blocked).

In one embodiment the factory-wide controller 230 includes a user interface 298. The user interface may include a graphical user interface for the ECA strategy engine shown in FIG. 4A. The user interface 298 may also include a reconfigurable multi-component dashboard interface that can provide the exact information that is needed to a particular user class. The dashboard interface provides ease-of-use by only providing the user with the information he/she needs to see without displaying unnecessary information. Moreover, the dashboard can provide information from multiple components on one screen so that the user can see a more complete picture of the manufacturing environment 222. The dashboard interface can also provide a re-usable solution across a user class thereby allowing the leveraging of re-usable training, documentation, etc.

The YMS 220 is responsible for managing yield and maintaining one or more yield prediction models. In one embodiment, the YMS 220 includes a yield analyzer 250 and a yield model generator 255. The yield analyzer 250 receives yield test results (e.g., based on e-test results, wafer acceptance testing (WAT), wafer sort testing, final testing, etc.) and analyzes the results to determine yield trends, yield correlations, etc. If yield excursions are detected, the yield analyzer 250 classifies the yield excursions.

Yield model generator 255 can generate yield prediction models through a combination of Design-of-Experiments (DOE) style analysis and input from process and yield experts. Over time, a yield prediction model library can be developed to shorten the model set discovery and definition time. Such a model library can include process specific, process-product specific, equipment specific, equipment-product specific, and equipment model specific categories. The yield prediction model library may be stored in consolidated data store 215.

In one embodiment, yield model generator 255 compares actual yield information (when available) with predicted information, and adjusts yield models accordingly. Once new yield information has been analyzed and classified by yield analyzer 250, for example, yield model generator 255 may combine the new yield information with existing yield information to generate a new or updated yield prediction model. If a PLS yield prediction model is used, PLS model adjustment techniques such as the nonlinear iterative partial least squares (NIPALS) algorithm can be utilized to modify the yield prediction model. The updated yield prediction model may then be sent to the yield predictor 228 to replace/update an existing yield prediction model used by the yield predictor 228. As systems evolve over time, the relationship between inputs and metrology indicator outputs changes (e.g., due to the build-up of polymers in an etch chamber between cleans). A dynamic yield prediction model that is updated periodically or continuously as new data is gathered can account for such changes.

In one embodiment, a baseline yield model or models are determined using DOE type data. The baseline yield model can then be changed as product yield information becomes available. Thus, both original DOE data and the latest measured data can be utilized together.

Figure 6:
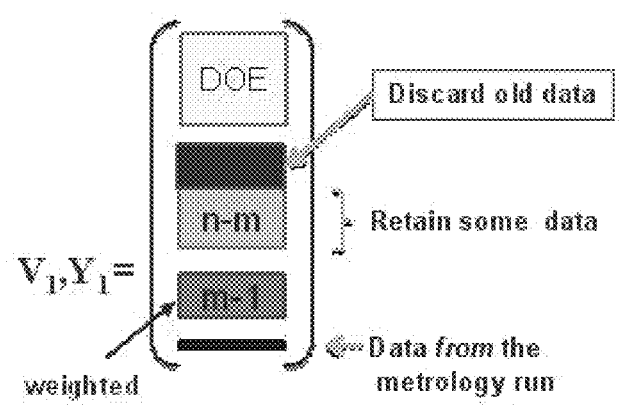
FIG. 6 illustrates a moving window technique is used to update a yield prediction model, in accordance with one embodiment of the present invention.

In one embodiment, a moving window technique is used to update the yield prediction model. One embodiment of such a moving window technique is shown in FIG. 6. In the moving window technique, DOE data is initially used to generate a yield prediction model. As new data is received, a portion of the data used in the prediction model is discarded, and a portion of the data used in the prediction model may be retained. In one embodiment, the DOE data is always retained, and only subsequently received data may be discarded. In one embodiment, oldest data (other than DOE data) is discarded. In such an embodiment, a moving window is used, wherein all data that is outside of the moving window is discarded, and all data within the moving window is retained. This allows the yield prediction model to evolve over time. A weighting may be applied to the retained data. The size of the window and the relative weighing of data impact the responsiveness of the model to changing conditions and its ability to reject noise. For example, a smaller window has an increased responsiveness, but is more susceptible to noise.

Figure 7A:
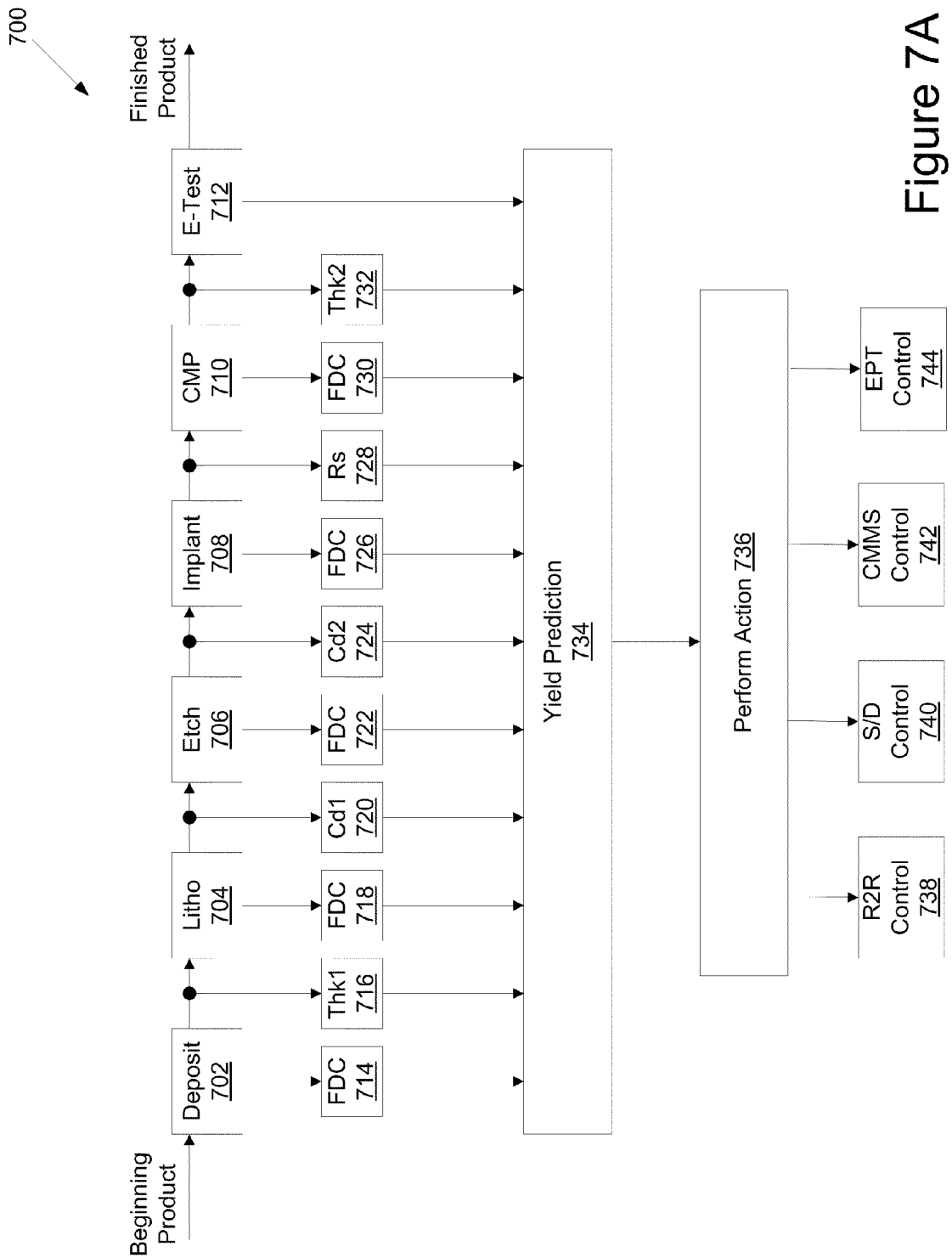
FIG. 7A illustrates a process flow diagram for manufacturing a semiconductor product, in accordance with one embodiment of the present invention.

FIG. 7A illustrates a process flow diagram 700 for a semiconductor product, in accordance with one embodiment of the present invention. The process flow reflects operations performed by numerous systems and machines in a manufacturing environment, such as manufacturing machines, metrology devices, servers, controllers, etc.

At block 702, a layer of material is deposited (or grown) on a substrate of a beginning product. The beginning product may be a bare substrate, or may be a patterned substrate that has undergone previous processing. During the deposition (block 702), fault detection and classification (FDC) analysis (block 714) of sensor data is performed (e.g., by FDC component 226 of FIG. 2). A yield prediction is then made (block 734) based on the FDC analysis (e.g., by yield predictor 228 of FIG. 2).

Once the layer has been deposited on the product substrate, the product may be evaluated by a metrology device (block 716). At block 716, a thickness measurement is performed on the newly deposited layer. The yield prediction can be updated based on the thickness measurement results (block 726).

The newly deposited layer is next patterned by a lithography machine (block 704). During the patterning process, FDC analysis of sensor data collected from the lithography machine is performed (block 718). The yield prediction is then updated based on the FDC analysis (block 734).

After the layer has been patterned, the product may be evaluated by a metrology device (block 720). At block 720, a critical dimension alignment measurement is performed. The yield prediction can be updated based on the critical dimension alignment measurement results (block 734).

In a subsequent process, the patterned layer is etched to remove portions of the layer (block 706). During the etch process, FDC analysis of sensor data collected from an etch machine is performed (block 722). The yield prediction is then updated based on the FDC analysis (block 734).

After portions of the patterned layer have been removed, the product may again be evaluated by a metrology device (block 724). At block 724, another critical dimension alignment measurement is performed. The yield prediction can be updated based on the new critical dimension alignment measurement results (block 734).

In a subsequent process, the product is implanted (e.g., doped with boron) by an implanter (block 708). During the implant process, FDC analysis of sensor data collected from the implanter is performed (block 726). The yield prediction is then updated based on the FDC analysis (block 734).

Once the product has been implanted, the product may again be evaluated by a metrology device (block 728). At block 728, a sheet resistance check is performed on the implanted regions of the product. The yield prediction can be updated based on the sheet resistance measurement results (block 734).

In a subsequent process, chemical mechanical planarization (CMP) is performed on the product to remove the patterned layer. During the CMP process, FDC analysis of sensor data collected from a CMP machine is performed (block 730). The yield prediction is then updated based on the FDC analysis (block 734).

After the product has been processed by the CMP, the product may again be evaluated by a metrology device (block 732). At block 732, a thickness test is performed to determine whether all of the patterned layer has been removed. The yield prediction can be updated based on the thickness measurement results (block 734).

Once all processing has been performed, the product may be electrically tested (block 712). A yield prediction may be updated based on the e-test results. Finally, yield may be measured for the finished product.

At any point during the above processing, a yield prediction may indicate a yield excursion event. If a yield excursion event is predicted, an action or actions may be performed (e.g., by strategy engine 235 of FIG. 2) to mitigate yield loss in the product being monitored and/or in future product. The yield prediction may include both the yield excursion event and one or more yield excursion conditions. Depending on the yield excursion event and/or the yield excursion conditions, the performed actions may pertain to R2R control (block 738), S/D control (block 740), CMMS control (block 742) and/or EPT control (block 744). For example, if a yield excursion event was reported based on the measurements of block 720, R2R control (block 838) may be performed to adjust a CD target at the etch process (block 706). Such an adjustment may mitigate or eliminate the earlier predicted yield excursion.

Figure 7B:
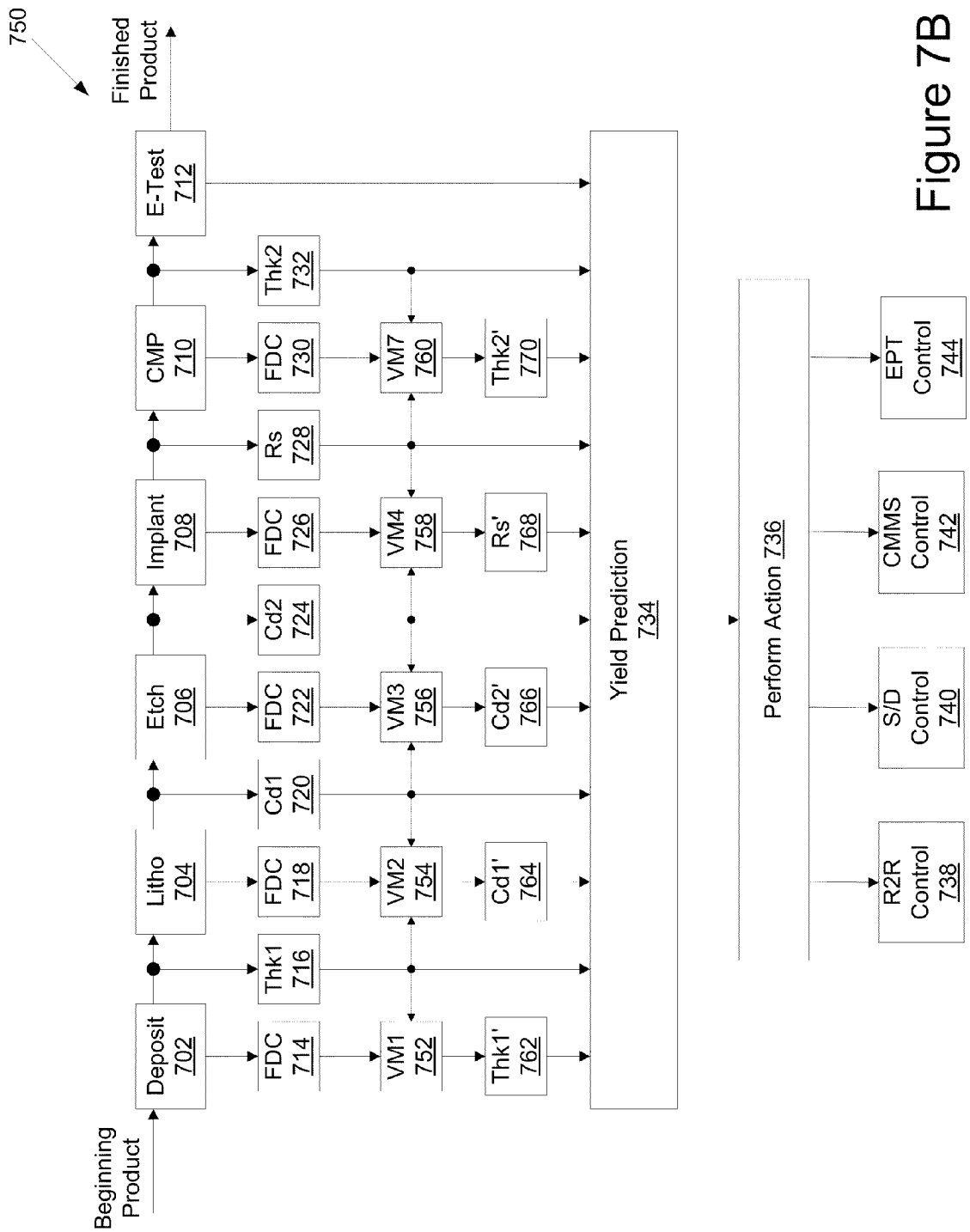
FIG. 7B illustrates a process flow diagram for manufacturing a semiconductor product, in accordance with another embodiment of the present invention.

FIG. 7B illustrates a process flow diagram 750 for a semiconductor product, in accordance with another embodiment of the present invention. The process flow reflects operations performed by numerous systems and machines in a manufacturing environment, such as manufacturing machines, metrology devices, servers, controllers, etc.

At block 702, a layer of material is deposited (or grown) on a substrate of a beginning product. The beginning product may be a bare substrate, or may be a patterned substrate that has undergone previous processing. During the deposition (block 702), fault detection and classification (FDC) analysis (block 714) of sensor data is performed (e.g., by FDC component 226 of FIG. 2). Virtual metrology is then performed (block 752) to determine a predicted thickness of the layer (block 762). A yield prediction is then made (block 734) based on the FDC analysis and the predicted thickness (e.g., by yield predictor 228 of FIG. 2).

Once the layer has been deposited on the product substrate, the product may be evaluated by a metrology device (block 716). At block 716, a thickness measurement is performed on the newly deposited layer. The thickness measurement data can be used to update a virtual metrology model used to predict the thickness of the layer (block 752). The yield prediction can also be updated based on the thickness measurement results (block 726).

The newly deposited layer is next patterned by a lithography machine (block 704). During the patterning process, FDC analysis of sensor data collected from the lithography machine is performed (block 718). Virtual metrology is then performed (block 754) to determine a predicted critical dimension alignment based on the sensor data and the metrology data collected before the lithography process began (block 764). The yield prediction is then updated based on the FDC analysis and the virtual metrology data (block 734).

After the layer has been patterned, the product may be evaluated by a metrology device (block 720). At block 720, a critical dimension alignment measurement is performed. The metrology data can be used to update a virtual metrology model used to predict the critical dimension alignment (block 754). The yield prediction can also be updated based on the critical dimension alignment measurement results (block 734).

In a subsequent process, the patterned layer is etched to remove portions of the layer (block 706). During the etch process, FDC analysis of sensor data collected from an etch machine is performed (block 722). Virtual metrology is then performed (block 756) to determine a predicted critical dimension alignment based on the sensor data and the metrology data collected before the etch process began (block 766). The yield prediction is then updated based on the FDC analysis and the virtual metrology data (block 734).

After portions of the patterned layer have been removed, the product may again be evaluated by a metrology device (block 724). At block 724, another critical dimension alignment measurement is performed. The metrology data can be used to update a virtual metrology model used to predict the new critical dimension alignment (block 754). The yield prediction can also be updated based on the new critical dimension alignment measurement results (block 734).

In a subsequent process, the product is implanted (e.g., doped with boron) by an implanter (block 708). During the implant process, FDC analysis of sensor data collected from the implanter is performed (block 726). Virtual metrology is then performed (block 758) to determine a predicted sheet resistance based on the sensor data and the metrology data collected before the implant process began (block 768). The yield prediction is then updated based on the FDC analysis and the virtual metrology data (block 734).

Once the product has been implanted, the product may again be evaluated by a metrology device (block 728). At block 728, a sheet resistance check is performed on the implanted regions of the product. The yield prediction and the model used to predict the sheet resistance can be updated based on the sheet resistance measurement results (block 734).

In a subsequent process, chemical mechanical planarization (CMP) is performed on the product to remove the patterned layer. During the CMP process, FDC analysis of sensor data collected from a CMP machine is performed (block 730). Virtual metrology is then performed (block 760) to determine a predicted thickness based on the sensor data and the metrology data collected before the CMP process began (block 770). The yield prediction is then updated based on the FDC analysis and the virtual metrology data (block 734).

After the product has been processed by the CMP, the product may again be evaluated by a metrology device (block 732). At block 732, a thickness test is performed to determine whether all of the patterned layer has been removed. The yield prediction and the virtual metrology model used to predict the thickness can be updated based on the thickness measurement results (block 734).

Once all processing has been performed, the product may be electrically tested (block 712). A yield prediction may be updated based on the e-test results. Finally, yield may be measured for the finished product.

At any during the above processing, a yield prediction may indicate a yield excursion event. If a yield excursion event is predicted, an action or actions may be performed (e.g., by strategy engine 235 of FIG. 2) to mitigate yield loss in the product being monitored and/or in future product. The yield prediction may include both the yield excursion event and one or more yield excursion conditions. Depending on the yield excursion event and/or the yield excursion conditions, the performed actions may pertain to R2R control (block 738), S/D control (block 740), CMMS control (block 742) and/or EPT control (block 744).

Figure 8:
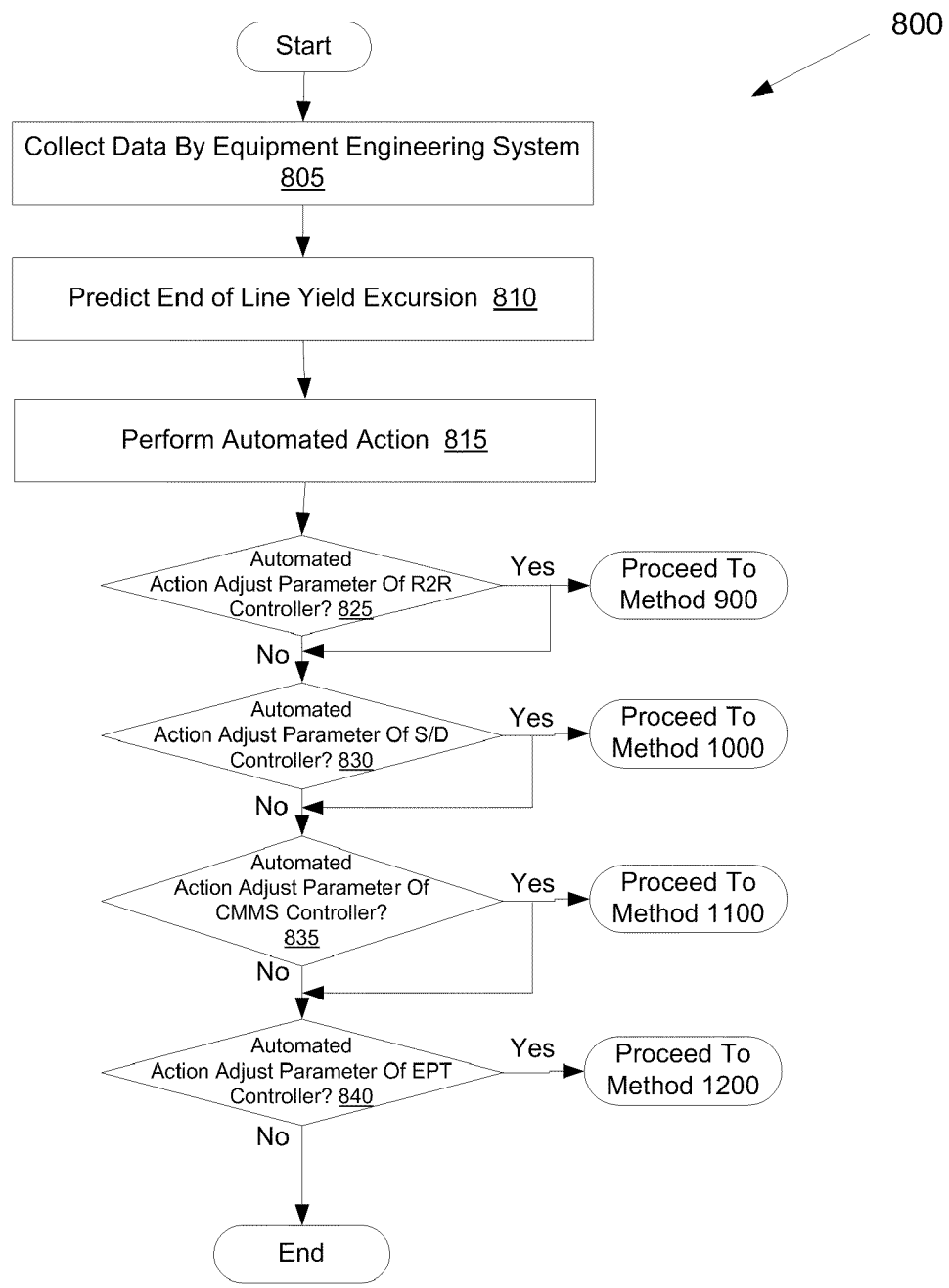
FIG. 8 illustrates a flow diagram of one embodiment for a method of performing automated actions by subsystems of an EES in response to yield predictions.

FIG. 8 illustrates a flow diagram of one embodiment for a method 800 of performing automated actions by subsystems of an EES in response to yield predictions. The method may be performed by processing logic that may comprise hardware (e.g., circuitry, dedicated logic, programmable logic, microcode, etc.), software (such as instructions run on a processing device), or a combination thereof. In one embodiment, method 800 is performed by subsystems of the equipment engineering system 205 of FIG. 2.

Referring to FIG. 8, method 800 includes collecting data by an equipment engineering system (block 805). The collected data includes data associated with a manufacturing process, a manufacturing tool and/or a manufactured product. Such data may be received from a manufacturing machine during processing of a product, from a metrology tool during measuring of a product, or from a data store. In one embodiment, the data is collected by FDC component 226 of FIG. 2. In a further embodiment, the FDC component 226 performs fault detection and classification using the data, and reduces the data to a reduced data set that can be used for yield prediction. The FDC component 226 may also perform virtual metrology to predict metrology values.

At block 810, processing logic predicts an end-of-line yield excursion. The end-of-line yield excursion may be predicted by a yield predictor 228 of FIG. 2 by comparing the data to a yield prediction model. In one embodiment, the yield predictor 228 receives a reduced data set from the FDC component 226, and performs yield prediction by applying the reduced data set to the yield prediction model. In a further embodiment, the yield predictor 228 receives virtual metrology data, and uses the virtual metrology data in combination with the reduced data set to predict yield. The yield prediction may include a yield excursion event and one or more yield excursion conditions. One such yield excursion condition may be a yield prediction quality indicator.

At block 815, processing logic performs an automated action in response to the yield prediction. In one embodiment, the automated action is determined by strategy engine 235 of FIG. 2. The strategy engine 235 may be an event-condition-action strategy engine. The event-condition-action strategy engine can compare the predicted yield excursion, yield excursion event and one or more yield excursion conditions to a collection of rules. One or more actions may be triggered if the yield excursion event and/or yield excursion conditions match a yield excursion event and/or yield excursion conditions included in a rule.

At block 825, processing logic determines whether the automated action adjusts a parameter of a run to run (R2R) controller. If the automated action adjusts a parameter of a R2R controller, the method initiates method 900 of FIG. 9. Whether or not the automated action adjusts a parameter of the R2R controller, the method proceeds to block 830.

At block 830, processing logic determines whether the automated action adjusts a parameter of a scheduling and dispatch (S/D) controller. If the automated action adjusts a parameter of the S/D controller, the method initiates method 1000 of FIG. 10. Whether or not the automated action adjusts a parameter of the S/D controller, the method proceeds to block 835.

At block 835, processing logic determines whether the automated action adjusts a parameter of a computerized maintenance management system (CMMS) controller. If the automated action adjusts a parameter of the CMMS controller, the method initiates method 1100 of FIG. 11. Whether or not the automated action adjusts a parameter of the CMMS controller, the method proceeds to block 840.

At block 840, processing logic determines whether the automated action adjusts a parameter of an equipment performance tracking (EPT) controller. If the automated action adjusts a parameter of the EPT controller, the method initiates method 1200 of FIG. 12. Otherwise the method ends.

Figure 9:
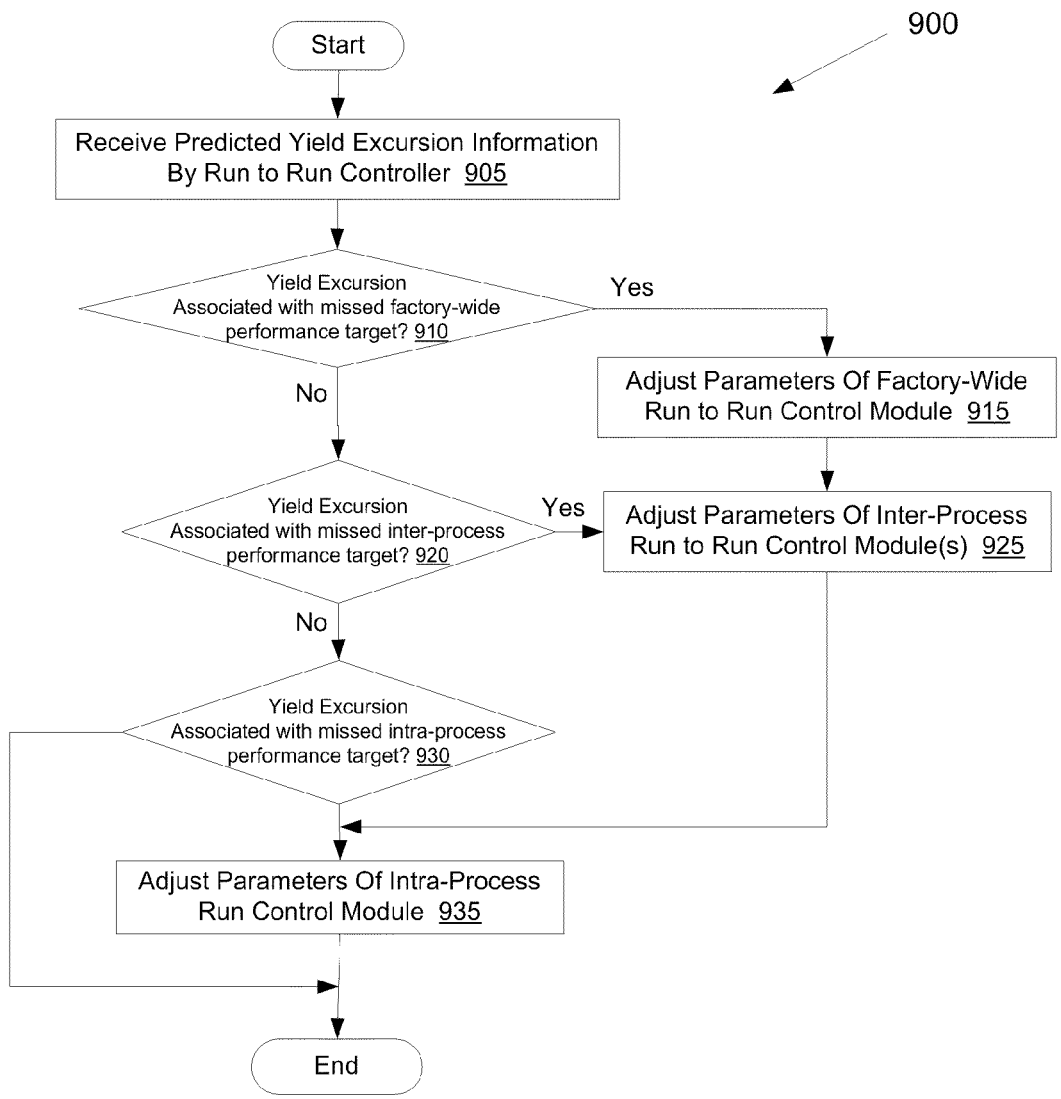
FIG. 9 illustrates a flow diagram of one embodiment for a method of tuning a run to run (R2R) controller in response to a yield prediction.

FIG. 9 illustrates a flow diagram of one embodiment for a method 900 of tuning a run to run (R2R) controller in response to a yield prediction. The method may be performed by processing logic that may comprise hardware (e.g., circuitry, dedicated logic, programmable logic, microcode, etc.), software (such as instructions run on a processing device), or a combination thereof. In one embodiment, method 900 is performed by R2R controller 260 of FIG. 2. Method 900 may be initiated by method 800 of FIG. 8.

Referring to FIG. 9, method 900 includes receiving predicted yield excursion information by the R2R controller (block 905). At block 910, the R2R controller determines whether the yield excursion is associated with a missed factory-wide performance target. An example of a factory-wide performance target is yield. For example, if the predicted yield is worse than a yield threshold for a product, then a factory-wide yield performance target may not be satisfied for the product. If the yield excursion is associated with a missed factory-wide performance target, the method proceeds to block 915. Otherwise, the method continues to block 920.

At block 920, the run to run controller determines whether the yield excursion is associated with missed inter-process performance targets. Examples of such inter-process performance targets include critical dimension control between processes and/or between layers, uniformity control between processes, etc. if the yield excursion is associated with a missed inter-process performance target, the method proceeds to block 925. Otherwise, the method proceeds to block 930.

At block 915, the run to run the controller adjusts parameters of a factory wide run to run control module. The parameters of the factory wide run to run control module may include targets and gains used by inter-process run to run control modules and or intra-process run to and control modules.

At block 925, the run to run controller adjusts parameters of one or more inter-process run to run control modules. The parameters of the one or more inter-process run to run control modules may be adjusted in response to adjustments made to the factory-wide run to run control module and/or in response to the predicted yield excursion. Such parameters may include targets and gains of intra-process run to run control modules. The method proceeds to block 935.

At block 930, the run to run controller determines whether the yield excursion is associated with missed intra-process performance targets. Examples of intra-process performance targets include processing parameters such as gas flow rates, pressure, temperature and product parameters such as film thickness, sheet resistance, critical dimension uniformity, etc. If the yield excursion is associated with missed intra-process performance targets, the method proceeds to block 935. Otherwise, the method ends.

At block 935, the run to run controller adjusts parameters of one or more intra-process run to run control modules. For example, the run to run controller may adjust gas flow rates, temperature settings, pressure settings, and so forth. The parameters of the one or more inter-process run to run control modules may be adjusted in response to adjustments made to the factory-wide run to run control module, in response to adjustments made to the inter-process run to run control modules and/or in response to the predicted yield excursion. The method then ends.

Figure 10:
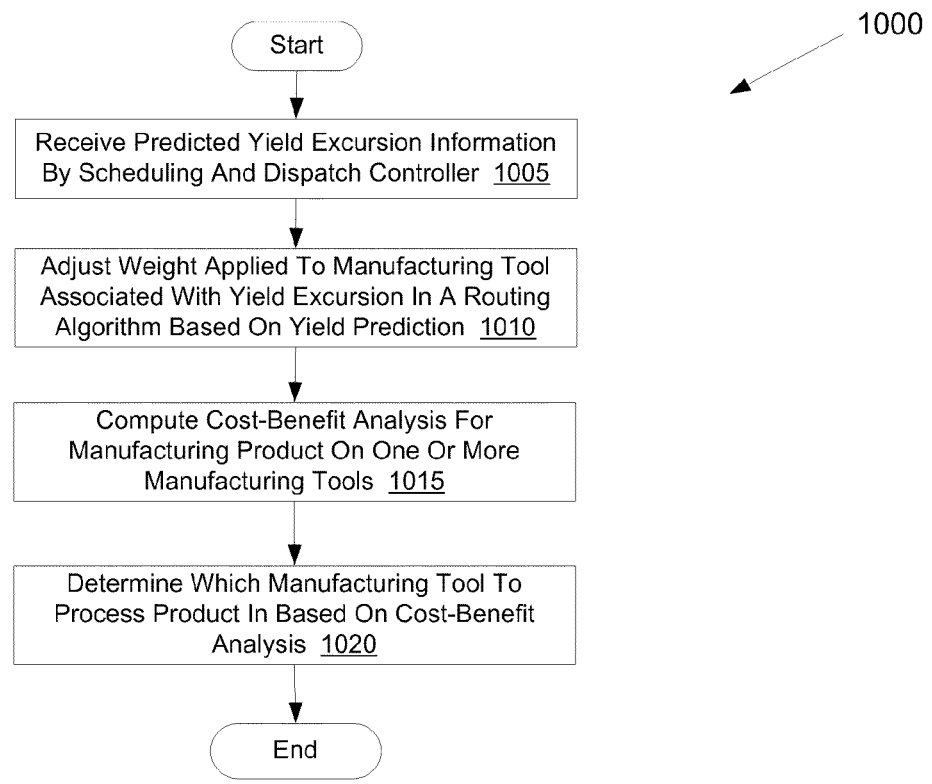
FIG. 10 illustrates a flow diagram of one embodiment for a method of routing product through manufacturing machines by a S/D controller.

FIG. 10 illustrates a flow diagram of one embodiment for a method 1000 of routing product through manufacturing machines by a S/D controller. The method may be performed by processing logic that may comprise hardware (e.g., circuitry, dedicated logic, programmable logic, microcode, etc.), software (such as instructions run on a processing device), or a combination thereof. In one embodiment, method 1000 is performed by S/D controller 265 of FIG. 2. Method 1000 may be initiated by method 800 of FIG. 8.

Referring to FIG. 10, method 1000 includes receiving predicted yield excursion information by the S/D controller (block 1005). At block 1010, the S/D controller adjusts a weight applied to a manufacturing tool associated with the yield excursion based on the predicted yield. For example, if a manufacturing tool causes a yield prediction for a specific product to be high, the manufacturing tool may be weighted such that the specific product is more likely to be processed on the manufacturing tool. Likewise, if the manufacturing tool causes a yield prediction for a specific product to be low, the manufacturing tool may be weighted such that the specific product is less likely to be processed on the manufacturing tool.

At block 1015, the S/D controller computes a cost-benefit analysis for manufacturing a product on one or more manufacturing tools. The cost-benefit analysis may be calculated using the routing algorithm. The routing algorithm can include as variables the number of manufacturing machines available, the amount of product that needs to be processed, the number of additional products that need to be processed, the weights of the available manufacturing machines for the product and for the additional products, etc. If an infinite weight has been applied to any manufacturing machines (e.g., to the manufacturing machine associated with the yield excursion), then no product will be processed on that manufacturing machine. An infinite weight may be applied to a manufacturing machine for a single product (e.g., for the product that experienced the yield excursion), in which case other products may still be scheduled on the manufacturing machine. Alternatively, the infinite weight may be applied to the manufacturing machine for all products, in which case no products will be processed on the manufacturing machine until it undergoes maintenance.

At block 1020, the S/D controller determines which manufacturing tool to process the product in based on the cost benefit analysis. The method then ends.

Figure 11:
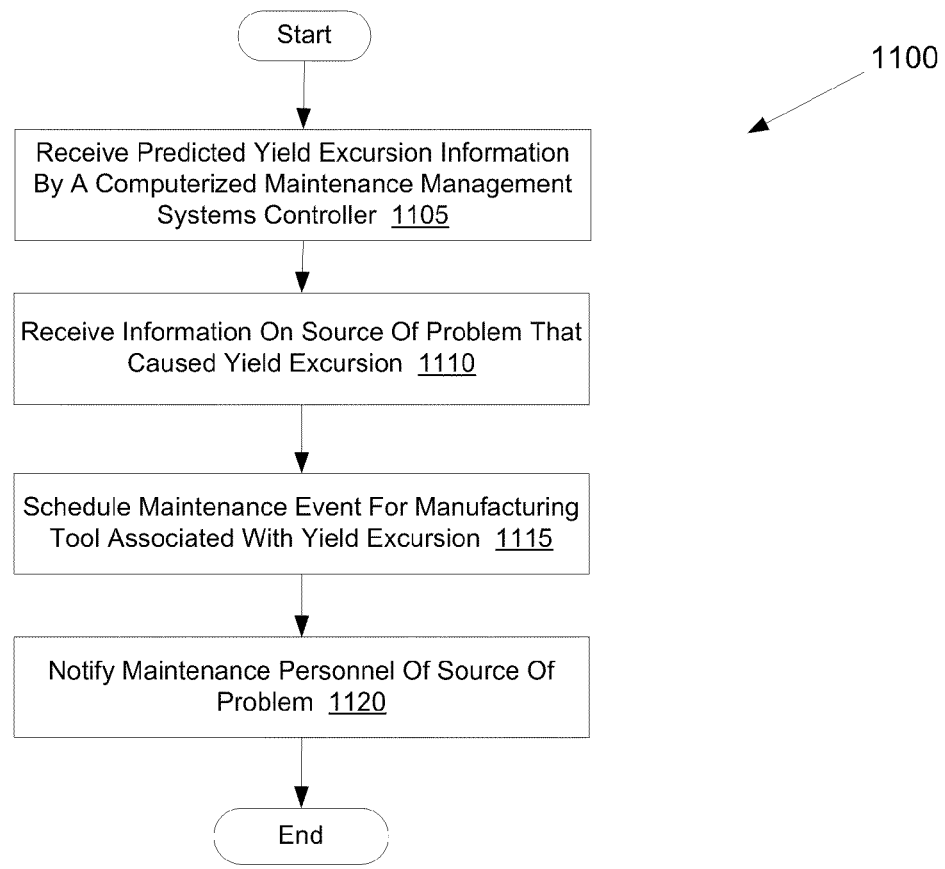
FIG. 11 illustrates a flow diagram of one embodiment for a method of scheduling maintenance for a manufacturing machine in response to a predicted yield excursion.

FIG. 11 illustrates a flow diagram of one embodiment for a method 1100 of scheduling maintenance for a manufacturing machine in response to a predicted yield excursion. The method may be performed by processing logic that may comprise hardware (e.g., circuitry, dedicated logic, programmable logic, microcode, etc.), software (such as instructions run on a processing device), or a combination thereof. In one embodiment, method 1100 is performed by CMMS controller 270 of FIG. 2. Method 1100 may be initiated by method 800 of FIG. 8.

Referring to FIG. 11, method 1100 includes receiving predicted yield excursion information by the CMMS controller (block 1105). At block 1110, the CMMS controller further receives information on a source of a problem that caused the predicted yield excursion. The information on the source of the problem may be based on yield excursion data maintained by a yield management system and/or may be associated with a fault classification.

At block 1115, the CMMS controller schedules a maintenance event for a manufacturing tool that is associated with the predicted yield excursion. At block 1120, maintenance personnel are notified of the potential source of the problem. For example, if a yield excursion is predicted based on out of control gas flow rates, the gas injection system for the manufacturing tool may be identified as the source of the problem. This helps maintenance personnel to quickly identify and solve problems.

Figure 12:
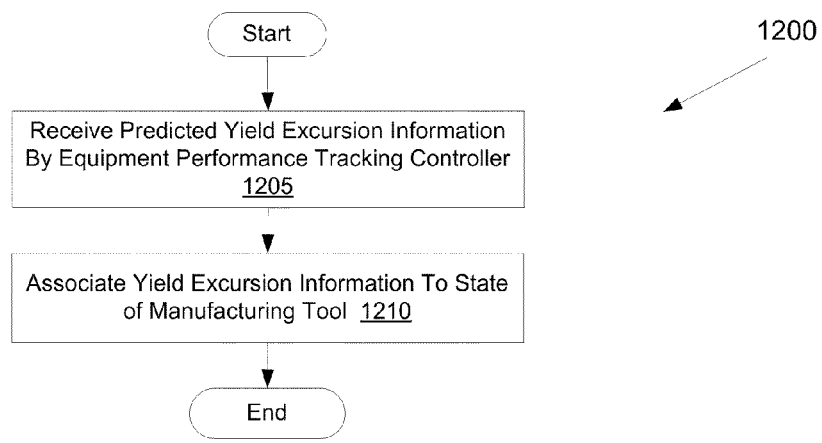
FIG. 12 illustrates a flow diagram of one embodiment for a method of tracking equipment performance.

FIG. 12 illustrates a flow diagram of one embodiment for a method 1200 of tracking equipment performance. The method may be performed by processing logic that may comprise hardware (e.g., circuitry, dedicated logic, programmable logic, microcode, etc.), software (such as instructions run on a processing device), or a combination thereof. In one embodiment, method 1200 is performed by EPT controller 275 of FIG. 2. Method 1200 may be initiated by method 800 of FIG. 8.

Referring to FIG. 12, method 1200 includes receiving predicted yield excursion information by the EPT controller (block 1205). At block 1210, the EPT controller associates the yield excursion information to a state of a manufacturing tool associated with the yield excursion. For example, if the manufacturing tool that caused the yield excursion was placed into maintenance due to the yield excursion, then its state may be, "unavailable." The EPT controller can further specify that the manufacturing machine is unavailable because of the predicted yield excursion.

Figure 13A:
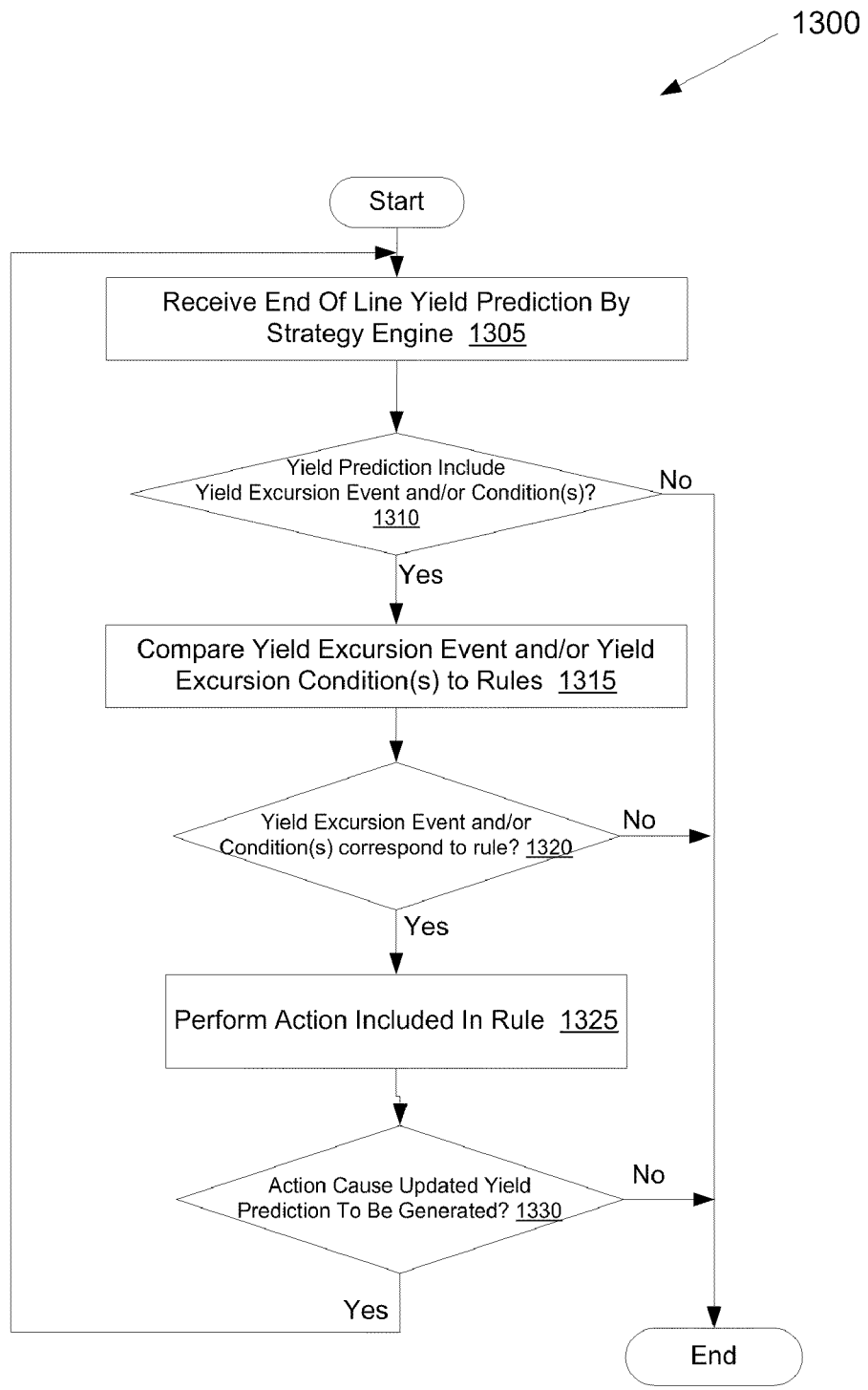
FIG. 13A illustrates a flow diagram of one embodiment for a method of automatically performing actions by a strategy engine in response to yield predictions.

FIG. 13A illustrates a flow diagram of one embodiment for a method 1300 of automatically performing actions by a strategy engine in response to yield predictions. The method may be performed by processing logic that may comprise hardware (e.g., circuitry, dedicated logic, programmable logic, microcode, etc.), software (such as instructions run on a processing device), or a combination thereof. In one embodiment, method 1300 is performed by strategy engine 235 of FIG. 2.

Referring to FIG. 13A, method 1300 includes receiving an end-of-line yield prediction by the strategy engine (block 1305). In one embodiment, the strategy engine is an event-condition-action strategy engine that is graphically configurable. At block 1310, the strategy engine determines whether the yield prediction includes a yield excursion event and/or any yield excursion conditions. A yield excursion event may occur whenever the predicted yield is below a predetermined yield threshold. Different yield thresholds may apply to different products. Examples of yield excursion conditions include contributors to the yield excursion event (e.g., out of control pressure, excessive particle count, poor critical dimension uniformity, etc.) and a confidence (quality) of the yield prediction. If the yield prediction includes no yield excursion event or yield excursion conditions, the method ends. If it does include a yield excursion event or a yield excursion condition, the method proceeds to block 1315.

At block 1315, the strategy engine compares the yield excursion event and/or yield excursion conditions to one or more rules. At block 1320, if the yield excursion event and/or yield excursion conditions correspond to a rule, the method proceeds to block 1325. Otherwise, the method ends.

At block 1325, the strategy engine performs an action included in the rule that corresponds to the yield excursion event and/or yield excursion conditions. The action pertains to a component (e.g., a subsystem) of an equipment engineering system. If multiple rules correspond to the yield excursion event and/or yield excursion conditions, then multiple actions may be performed. For example, a first rule may cause a maintenance event to be scheduled, a second rule may cause parameters of a R2R control module to be adjusted, etc. Some rules may preempt other rules. For example, if a first yield excursion condition is reported, actions included in a first rule may be performed. However, if both the first yield excursion condition and a second yield excursion condition are reported, actions included in a second rule may be performed, and actions included in the first rule may not be performed. The actions may cause the predicted yield excursion to be mitigated and/or may prevent future product from experiencing the same yield excursion event.

At block 1330, if the action caused an updated yield prediction to be generated, the method returns to block 1305 and the updated yield prediction is reviewed by the strategy engine. Otherwise the method ends.

Figure 13B:
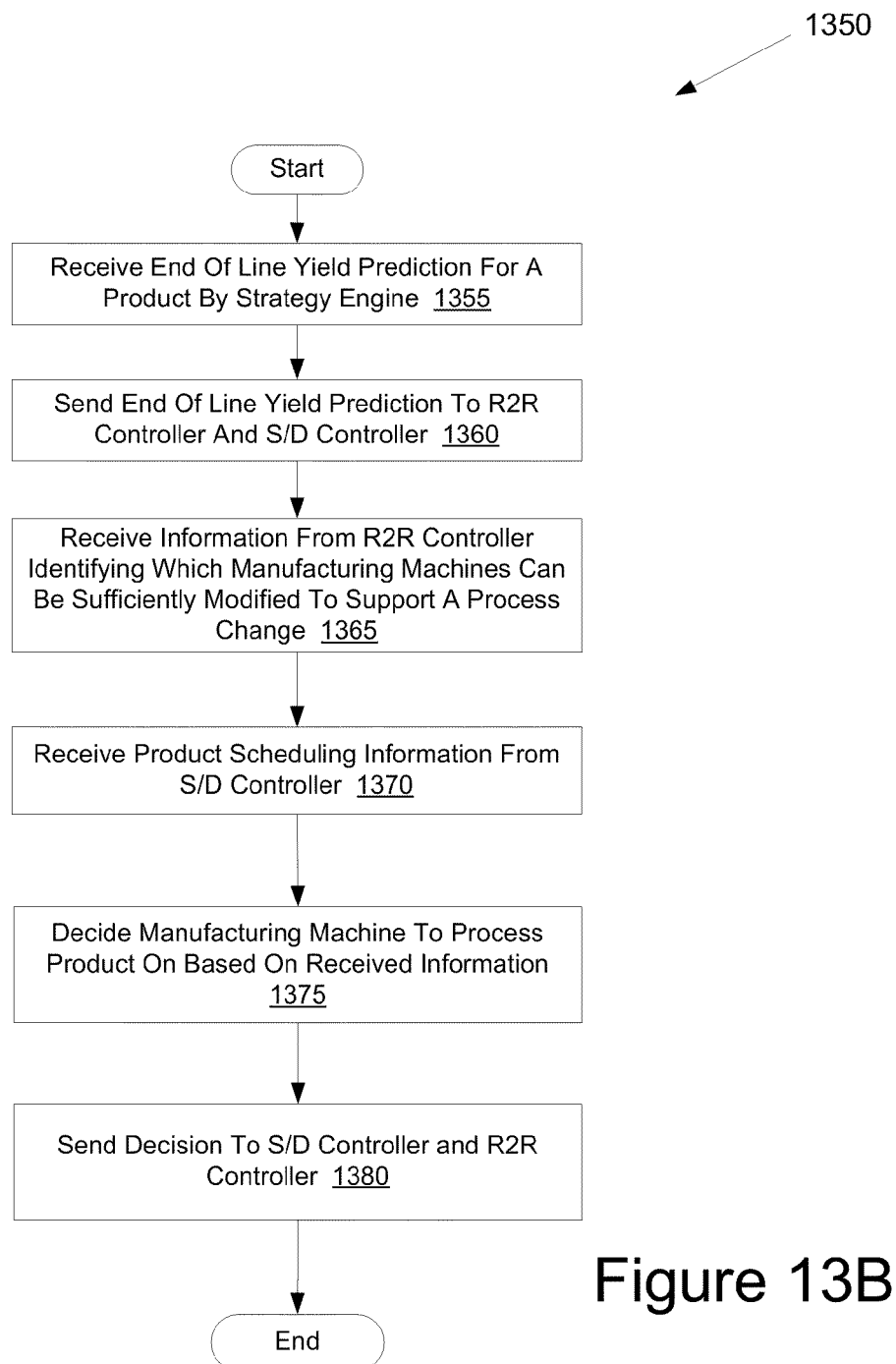
FIG. 13B illustrates a flow diagram of another embodiment for a method of automatically performing actions by a strategy engine in response to yield predictions.

FIG. 13B illustrates a flow diagram of another embodiment for a method 1350 of automatically performing actions by a strategy engine in response to yield predictions. The method may be performed by processing logic that may comprise hardware (e.g., circuitry, dedicated logic, programmable logic, microcode, etc.), software (such as instructions run on a processing device), or a combination thereof. In one embodiment, method 1350 is performed by strategy engine 235 of FIG. 2.

Referring to FIG. 13B, method 1350 includes receiving an end-of-line yield prediction by the strategy engine (block 1355). At block 1360, the end-of-line yield prediction is sent to a R2R controller and a S/D controller. At block 1365, the strategy engine receives information from the R2R controller that identifies which manufacturing machines can be sufficiently modified to support a process change that will mitigate the predicted yield excursion.

At block 1370, the strategy engine receives product scheduling information from the S/D controller. The product scheduling information may identify which of the manufacturing machines are available to process the product. At block 1375, the strategy engine determines a manufacturing machine on which to process the product based on the information received from the S/D controller and the R2R controller. This decision may then be sent to the S/D controller and to the R2R controller so that they can implement the decision (block 1380). The method then ends.

Figure 14:
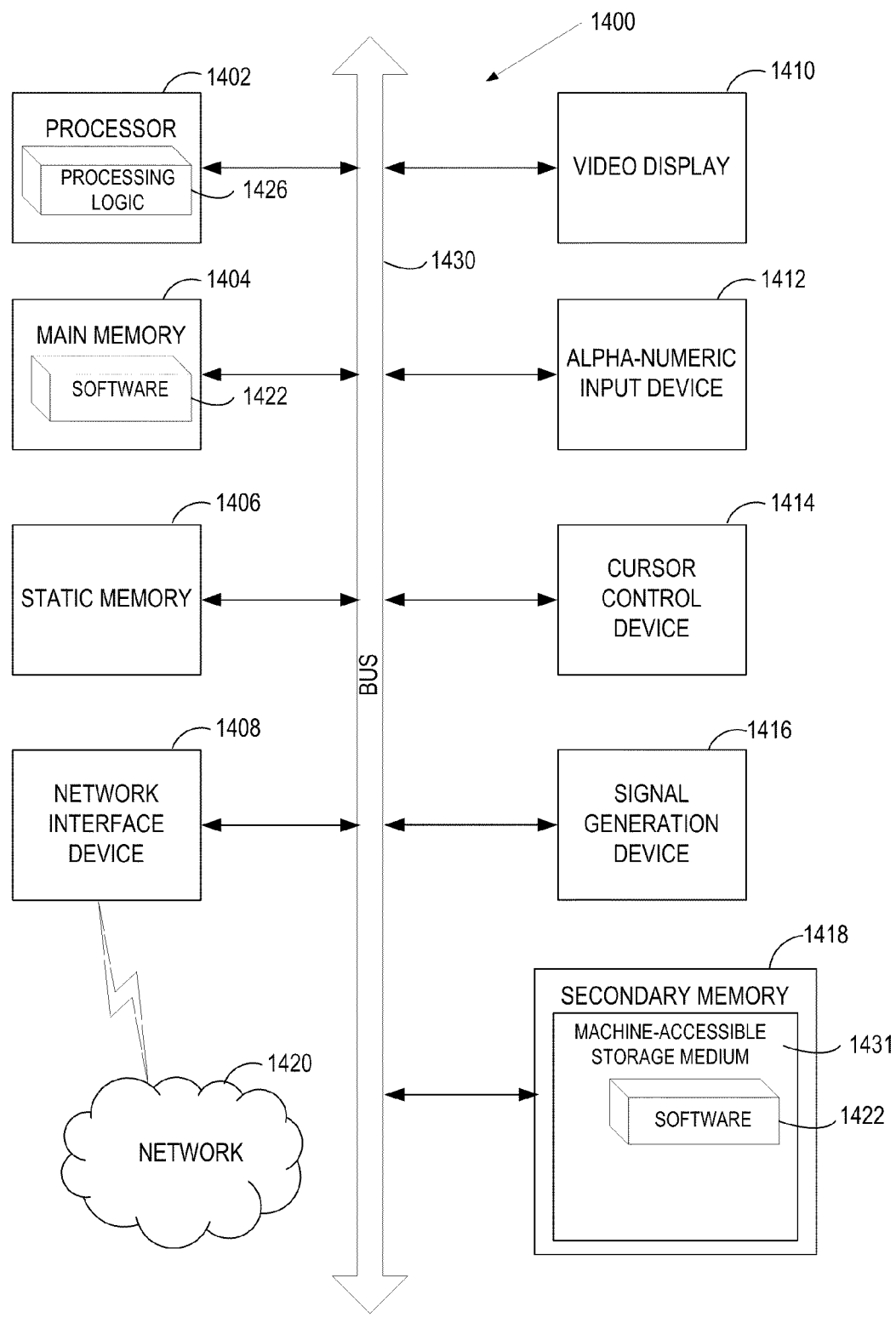
FIG. 14 illustrates a block diagram of an exemplary computer system, in accordance with one embodiment of the present invention.

FIG. 14 illustrates a diagrammatic representation of a machine in the exemplary form of a computer system 1400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1400 includes a processor 1402, a main memory 1404 (e.g., read-only memory (ROM), flash memory, dynamic random access memory (DRAM) such as synchronous DRAM (SDRAM) or Rambus DRAM (RDRAM), etc.), a static memory 1406 (e.g., flash memory, static random access memory (SRAM), etc.), and a secondary memory 1418 (e.g., a data storage device), which communicate with each other via a bus 1430.

Processor 1402 represents one or more general-purpose processing devices such as a microprocessor, central processing unit, or the like. More particularly, the processor 1402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1402 may also be one or more special-purpose processing devices such as an application specific integrated circuit (ASIC), a field programmable gate array (FPGA), a digital signal processor (DSP), network processor, or the like. Processor 1402 is configured to execute the processing logic 1426 for performing the operations and steps discussed herein.

The computer system 1400 may further include a network interface device 1408. The computer system 1400 also may include a video display unit 1410 (e.g., a liquid crystal display (LCD) or a cathode ray tube (CRT)), an alphanumeric input device 1412 (e.g., a keyboard), a cursor control device 1414 (e.g., a mouse), and a signal generation device 1416 (e.g., a speaker).

The secondary memory 1418 may include a machine-readable storage medium (or more specifically a computer-readable storage medium) 1431 on which is stored one or more sets of instructions (e.g., software 1422) embodying any one or more of the methodologies or functions described herein. The software 1422 may also reside, completely or at least partially, within the main memory 1404 and/or within the processing device 1402 during execution thereof by the computer system 1400, the main memory 1404 and the processing device 1402 also constituting machine-readable storage media. The software 1422 may further be transmitted or received over a network 1420 via the network interface device 1408.

The machine-readable storage medium 1431 may also be used to store one or more subsystems of a yield management system (YMS) 220, an equipment engineering system (EES) 205 and/or a manufacturing execution system (MES) 210 (as described with reference to FIG. 2), and/or a software library containing methods that call subsystems of a YMS, EES and/or MES. The machine-readable storage medium 1431 may further be used to store one or more additional components of a manufacturing information and control system (MICS), such as a decision support logic component, a real-time monitor, and/or an execution logic component. While the machine-readable storage medium 1431 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer implemented method comprising:
   receiving a yield prediction and a yield prediction confidence by a scheduling and dispatch controller, wherein the yield prediction is associated with a manufacturing tool and a product and the yield prediction confidence is associated with the yield prediction;
   adjusting a weighting of the manufacturing tool in a routing algorithm based on the yield prediction and the yield prediction confidence;
   computing a cost-benefit analysis that identifies a cost and a benefit of manufacturing future products on the manufacturing tool; and
   determining whether to process a future product on the manufacturing tool based on the cost-benefit analysis.

2. The method of claim 1, wherein the weighting adjusts a likelihood that the future products will be processed on the manufacturing tool.

3. The method of claim 1, wherein the cost-benefit analysis is computed using a scoring algorithm that includes the yield prediction as a factor.

4. The method of claim 3, further comprising:
   calculating a dispatch score for the manufacturing machine using the scoring algorithm;
   calculating additional dispatch scores for additional manufacturing machines; and
   if the dispatch score is higher than the additional dispatch scores for the future product, scheduling the future product to be processed by the manufacturing machine.

5. A non-transitory computer readable medium including instructions that, when executed by a processing system, cause the processing system to perform a method comprising:
   receiving a yield prediction and a yield prediction confidence by a scheduling and dispatch controller, wherein the yield prediction is associated with a manufacturing tool and a product and the yield prediction confidence is associated with the yield prediction;
   adjusting a weighting of the manufacturing tool in a routing algorithm based on the yield prediction and the yield prediction confidence;
   computing a cost-benefit analysis that identifies a cost and a benefit of manufacturing future products on the manufacturing tool; and
   determining whether to process a future product on the manufacturing tool based on the cost-benefit analysis.

6. The non-transitory computer readable medium of claim 5, wherein the weighting adjusts a likelihood that the future products will be processed on the manufacturing tool.

7. The non-transitory computer readable medium of claim 5, wherein the cost-benefit analysis is computed using a scoring algorithm that includes the yield prediction as a factor.

8. The non-transitory computer readable medium of claim 7, the method further comprising:
   calculating a dispatch score for the manufacturing machine using the scoring algorithm;

calculating additional dispatch scores for additional manufacturing machines; and if the dispatch score is higher than the additional dispatch scores for the future product, scheduling the future product to be processed by the manufacturing machine.

9. An equipment engineering system comprising:

one or more memories to store instructions for a yield predictor and for a scheduling and dispatch controller; and one or more processors, connected to the one or more memories, to execute the instructions; wherein the yield predictor to make a yield prediction and to compute a yield prediction confidence for the yield prediction, wherein the yield prediction is associated with a manufacturing tool and a product; and the scheduling and dispatch controller to receive the yield prediction and the yield prediction confidence, to adjust a weighting of the manufacturing tool in a routing algorithm based on the yield prediction and the yield prediction confidence, to compute a cost-benefit analysis that identifies a cost and a benefit of manufacturing future products on the manufacturing tool, and to determine whether to process a future product on the manufacturing tool based on the cost-benefit analysis.

10. The equipment engineering system of claim 9, wherein the weighting adjusts a likelihood that the future products will be processed on the manufacturing tool.

11. The equipment engineering system of claim 9, wherein the cost-benefit analysis is computed using a scoring algorithm that includes the yield prediction as a factor.

12. The equipment engineering system of claim 11, further comprising:

the scheduling and dispatch controller to calculate a dispatch score for the manufacturing machine using the scoring algorithm, to calculate additional dispatch scores for additional manufacturing machines, and to schedule the future product to be processed by the manufacturing machine if the dispatch score is higher than the additional dispatch scores for the future product.

* * * * *